United States Patent
Hara et al.

(10) Patent No.: US 7,916,210 B2
(45) Date of Patent: Mar. 29, 2011

(54) DRIVING DEVICE AND IMAGE STABILIZING SYSTEM

(75) Inventors: Yoshihiro Hara, Takatsuki (JP); Junichi Tanii, Izumi (JP); Shigeru Wada, Kishiwada (JP); Akira Kosaka, Yao (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1062 days.

(21) Appl. No.: 11/443,903

(22) Filed: May 31, 2006

(65) Prior Publication Data
US 2006/0272328 A1    Dec. 7, 2006

(30) Foreign Application Priority Data
Jun. 6, 2005    (JP) .................. 2005-165601

(51) Int. Cl.
*H04N 5/225* (2006.01)
(52) U.S. Cl. .................... 348/373; 348/219.1
(58) Field of Classification Search ............ 348/208.99, 348/373, 219.1; 396/133
See application file for complete search history.

(56) References Cited

U.S. PATENT DOCUMENTS

| | | | | |
|---|---|---|---|---|
| 5,459,544 A | * | 10/1995 | Emura | 396/257 |
| 5,507,766 A | * | 4/1996 | Kugo et al. | 606/194 |
| 6,048,109 A | * | 4/2000 | Kikuchi | 396/439 |
| 6,307,678 B2 | * | 10/2001 | Kosaka et al. | 359/557 |
| 6,459,855 B1 | * | 10/2002 | Kosaka et al. | 396/177 |
| 6,574,958 B1 | * | 6/2003 | MacGregor | 60/527 |
| 7,307,653 B2 | * | 12/2007 | Dutta | 348/208.7 |

FOREIGN PATENT DOCUMENTS

| JP | 9-133069 A | 5/1997 |
|---|---|---|
| JP | 2003-125590 | 4/2003 |
| JP | 2005-76597 A | 3/2005 |

OTHER PUBLICATIONS

Japanese Office Action dated Nov. 2, 2010, for counterpart Japanese Application No. 2005-165601, together with an English translation thereof.

* cited by examiner

*Primary Examiner* — Nhan T Tran
*Assistant Examiner* — Tuan H Le
(74) *Attorney, Agent, or Firm* — Sidley Austin LLP

(57) ABSTRACT

An art of a driving device for appropriately improving a response of an SMA actuator will be provided. A portable telephone 1 has an image stabilization system 10 for driving an image pickup unit 9 by a pair of driving members 15a and 15b functioning as actuators, thereby performing image stabilization. Driving members 15a and 15b are formed as a wire of shape memory alloy (SMA) and when a voltage is applied to both ends and a current is supplied, driving force is generated in the contraction direction. With respect to the wire diameter of the SMAs, the wire diameter of the SMAs is set between 10 μm and 80 μm, thus the mountability and response are improved appropriately.

16 Claims, 18 Drawing Sheets ically and mounted on the moving part in a push-pull
DRIVING DEVICE AND IMAGE STABILIZING SYSTEM This application is based on Japanese Patent Application No. 2005-165601 filed on Jun. 6, 2005, in Japanese Patent Office, the entire content of which is hereby incorporated by reference.

TECHNICAL FIELD

The present invention relates to an art of a driving device for driving a moving part using an actuator connected to the moving part.

BACKGROUND

A shape memory alloy (hereinafter, may be referred to as SMA) has a characteristic that, even if it is applied with external force at the martensite transformation starting temperature or lower and is deformed plastically, if it is heated up to the reverse transformation ending temperature or higher, it is restored to the memorized shape. An art for using an SMA having such a characteristic as an actuator is known.

When performing image stabilization by an actuator using an SMA (hereinafter, may be referred to as SMA actuator), a driving performance of canceling image shaking of at least about 10 Hz is required.

Therefore, an art for improving the driving performance of the SMA actuator having a low response, for example, is proposed in Patent Document 1. The art performs a differential operation two times or more in a servo control system to improve a phase lag, thereby enhances the response of the SMA actuator.

Patent Document 1: Japanese Laid-Open Patent Application 2003-125590

However, the art of Patent Document 1 aforementioned performs the differential operation two times or more, so that noise included in a measurement signal such as position is amplified, thus a special filter is necessary for a countermeasure therefore. Further, there is a problem imposed that tuning of the aforementioned differential control is difficult and corrections according to changes in the environmental temperature are necessary. As mentioned above, when improving the response of the SMA actuator only by improvement of the control system (software), various problems are caused as side effects, thus the response cannot be improved appropriately.

SUMMARY

The present invention was developed with the foregoing in view and is intended to provide an art of a driving device for appropriately improving the response concerning the SMA actuator.

In view of forgoing, one embodiment according to one aspect of the present invention is a driving device including a moving part, comprising:

an actuator which, for driving the moving part, includes a first member and a second member which are expandable and contractable and mounted on the moving part in a push-pull position, the first member being a shape memory alloy wire having a diameter of no less than 10 μm and no more than 80 μm;

a measurement section which obtains a measurement value related to the driving of the moving part; and a control section which controls the driving of the moving part by electrifying the shape memory alloy wire on the basis of a deviation concerning a driving target value related to the moving part and the measurement value.

According to another aspect of the present invention, another embodiment is a driving device including a moving part, comprising:

an actuator which, for driving the moving part, includes a first member and a second member which are expandable and contractable and mounted on the moving part in a push-pull position, the first member being a shape memory alloy wire having a cross-sectional area of no less than 80 μm² and no more than 5030 μm²;

a measurement section which obtains a measurement value related to the driving of the moving part; and a control section which controls the driving of the moving part by electrifying the shape memory alloy wire on the basis of a deviation concerning a driving target value related to the moving part and the measurement value.

According to another aspect of the present invention, another embodiment is an image stabilizing system having the abovementioned driving device, comprising:

an imaging section which includes the moving part and images a photographic subject; and a correction section which corrects image shaking related to the imaging section by driving the moving part by controlling the actuator.

DETAILED DESCRIPTION OF THE PREFERRED EMBODIMENT

Constitution of Essential Section of Portable Telephone

Figure 1:
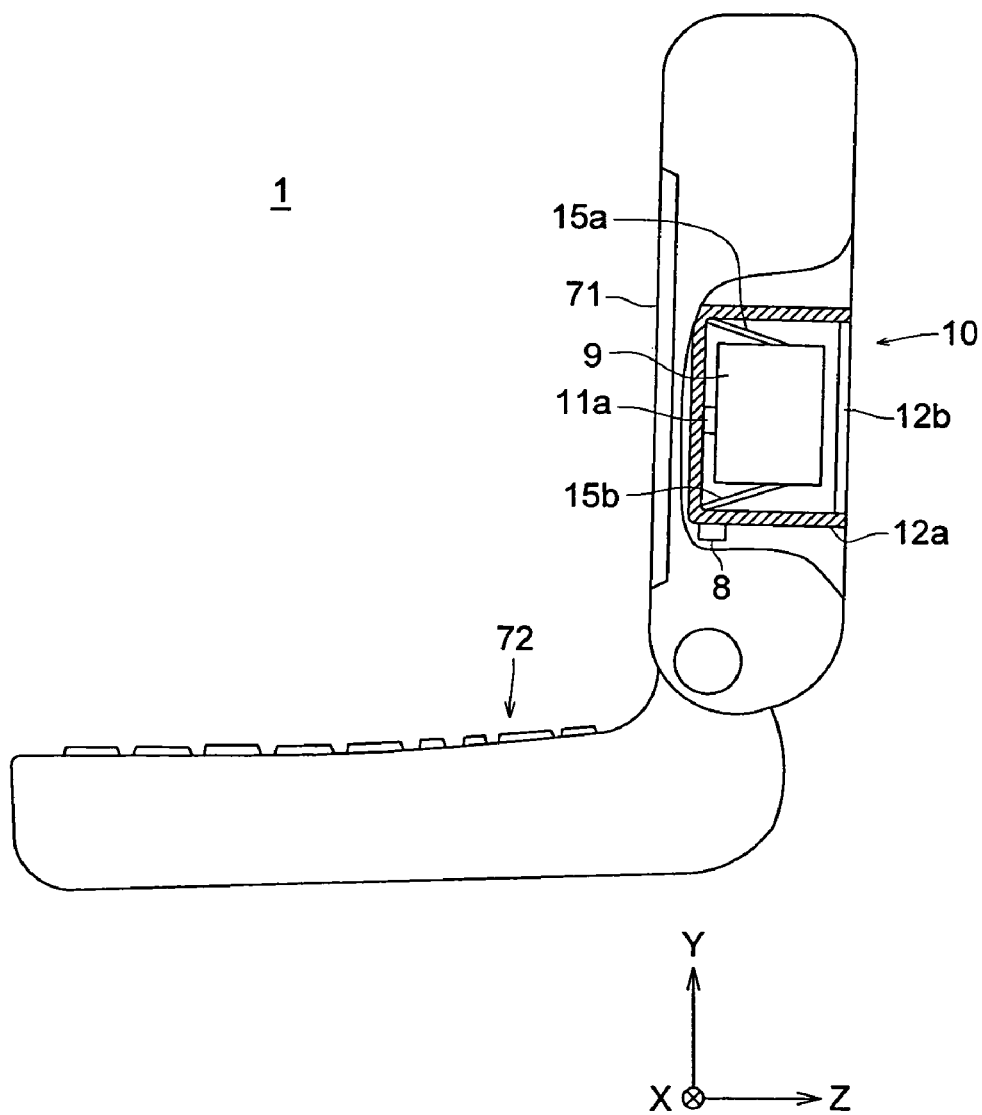
FIG. 1 is a side view showing a portable telephone 1 having an incorporated image stabilization system 10 relating to the embodiment of the present invention.

FIG. 1 is a side view showing the portable telephone 1 having the incorporated image stabilization system 10 relating to the embodiment of the present invention. The portable telephone 1 has a communication function and an image pickup function, thereby functions not only as a communication device but also as an image pickup device.

As shown in FIG. 1, the portable telephone 1 has a display unit 71 composed of an LCD and others and an input unit 72 composed of various keys on the surface of the body. Further, in the separated part shown in FIG. 1, the internal situation of the portable telephone 1 is shown. As shown in the separated part, the portable telephone 1 includes the image stabilization system 10 for operating as a driving device.

Figure 2:
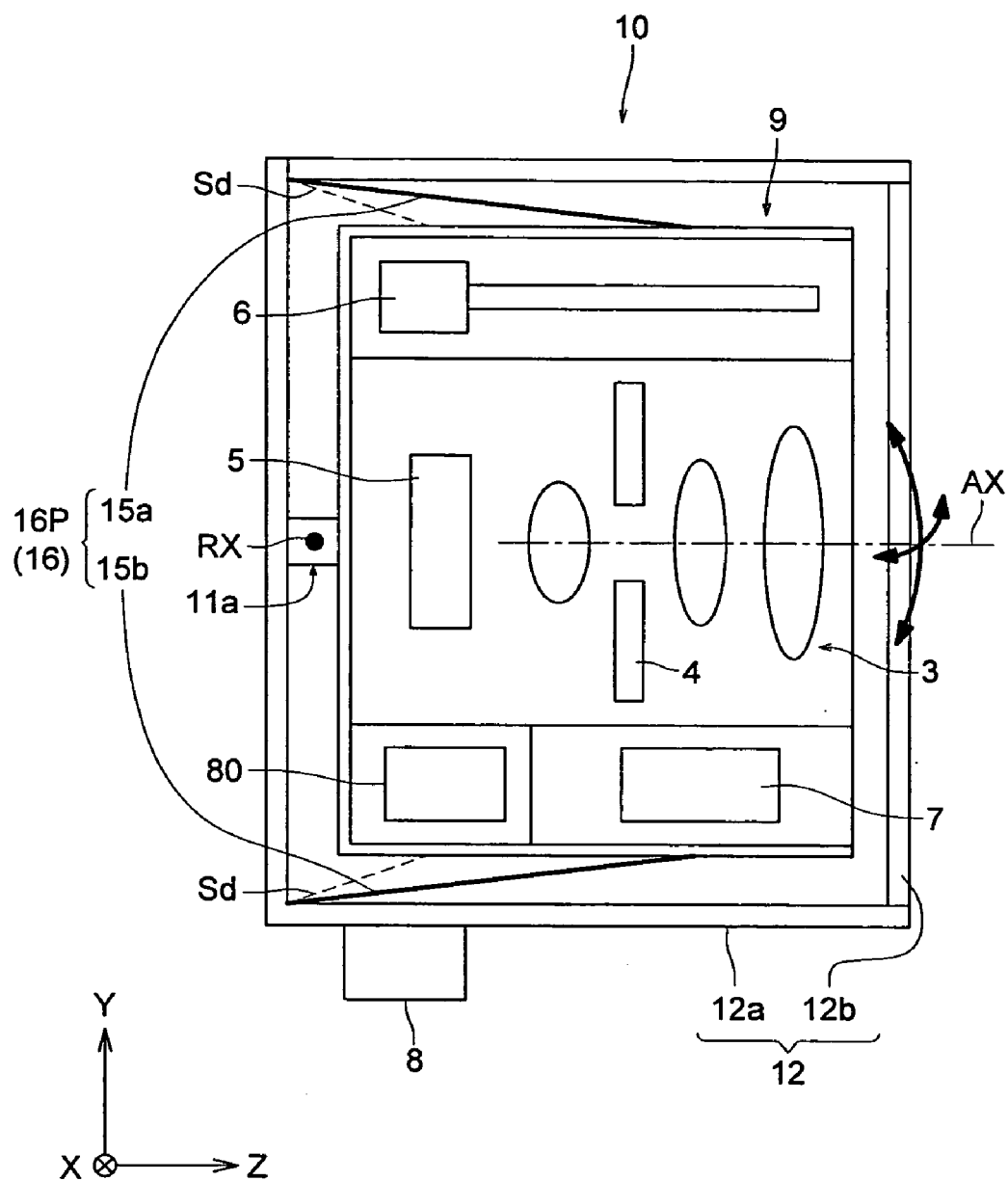
FIG. 2 is a drawing showing the elements included in the image stabilization system 10 more in detail.

FIG. 2 is a drawing showing the elements included in the image stabilization system 10 more in detail. As shown in FIG. 2, the image stabilization system 10 includes an image pickup unit 9 in an almost cylindrical shape and a body-side member (may be referred to as a frame-side member) 12 in an almost cylindrical shape having an inside diameter larger than the outside diameter of the image pickup unit 9. Further, FIG. 2 is a side view, so that the image pickup unit 9 and body-side member 12 are shown in a rectangular parallelepiped-shape in FIG. 2, though as viewed from the front side, the image pickup unit 9 and body-side member 12 are in an almost circular shape.

The image pickup unit 9 includes an image pickup lens 3, a stop 4, an image pickup device 5, a focus actuator 6, a stop actuator 7, and a position sensor 80. The image pickup lens 3, stop 4, image pickup device 5, focus actuator 6, stop actuator 7, and position sensor 80 are all fixed to the image pickup unit 9. The image pickup lens 3 is composed of one or a plurality of lenses. An optical image of a photographic object (photographic object image) passing through the image pickup lens 3 is focused by the image pickup device 5. The image pickup device 5 has fine pixels having attached color filters and for example, converts photoelectrically an image to an image signal having color components of R, G, and B. The image pickup device 5 uses, for example, a CCD or a CMOS. Further, the focus actuator 6 moves the focus lens of the image pickup lens 3, thereby can put the photographic object into the focusing state and the stop actuator 7 drives the blade of the stop 4, thereby can adjust the stopping condition of the stop 4. Further, the position sensor 80 is fixed to the image pickup unit 9, functions as a measurement section and obtains position information (measurement values concerning driving) of the image pickup unit 9.

The body-side member 12 is composed of a member 12a in an almost cylindrical shape having one opened end face and a cover glass 12b installed so as to close the open surface of the member 12a. The body-side member 12 is a member fixed to the body side of the portable telephone 1 and in detail, the member 12a is fixed to the body of the portable telephone. Further, the light-transmissible cover glass 12b has a roll of preventing the image pickup unit 9 from entry of foreign substances from the outside and a roll of transmitting an optical image from a photographic object and leading it to the image pickup device 5 via the image pickup lens 3.

Further, the image stabilization system 10 has a vibration sensor 8 fixed to the outer wall of the member 12a. The vibration sensor 8 detects vibration of the portable telephone 1.

Further, the image stabilization system 10 additionally has an elastic support member 11a in an almost cylindrical shape. The elastic support member 11a is installed between the image pickup unit 9 and the body-side member 12. One end face of the elastic support member 11a is fixed to the image pickup unit 9 and the other end face is fixed to the body-side member 12. In this way, the image pickup unit 9 is basically fixed to the body-side member 12 by the elastic support member 11a.

However, the image pickup unit 9 is supported by the elastic support member 11a which is elastic, so that when driving force is applied to it by a driving unit 16 which will be described later, the image pickup unit 9 makes a two-dimensional rotary motion at a fulcrum of the elastic support member 11a, concretely moves in the rotational direction (pitch direction) around the axis X and moves in the rotational direction (yawing direction) round the axis Y. Namely, force greater than the holding force by the elastic support member 11a is applied as driving force, so that the image pickup unit 9 can swing around a predetermined rotation axis (axis parallel with the axis X and axis parallel with the axis Y) for the body-side member 12.

Therefore, as described later, even if the body of the portable telephone 1 is vibrated due to hand vibration, the image pickup unit 9 is moved in a direction for canceling the detected vibration (in other words, in the opposite direction to the detected swing) by the vibration sensor 8, thus the image shaking can be corrected.

As described above, the image pickup unit 9, when not driven by the driving unit 16 (will be described later), is fixed to the body-side member 12, while when the driving force is given by the driving unit 16, is moved relatively to the body-side member 12. Namely, the image pickup unit 9 is supported (held) by proper strength.

Further, in FIGS. 1 and 2, a rectangular coordinate system of X, Y, and Z is set. The axis X indicates the horizontal direction, and the axis Y indicates the vertical direction, and the axis Z indicates a direction orthogonal to the axes X and Y. In the subsequent explanation, the rectangular coordinate system of X, Y, and Z will be referred to properly.

<Detailed Driving System of Image Stabilization System>

As shown in FIG. 2, the image stabilization system 10 has the driving unit 16 for driving the image pickup unit 9. In detail, it has a P driving actuator 16P for driving the image pickup unit 9 in the rotational direction (pitch direction) around the axis X and a Y driving actuator 16Y (refer to FIG. 6) for driving the image pickup unit 9 in the rotational direction (yawing direction) around the axis Y. In other words, the P driving actuator 16P can drive the image pickup unit 9 to rotate in the pitch direction and the Y driving actuator 16Y can drive the image pickup unit 9 to rotate in the yawing direction. Using the P and Y driving actuators 16P and 16Y, the image pickup unit 9 is driven to rotate in the pitch direction and yawing direction, thus the vibration of the image pickup unit 9 can be corrected, that is, the image shaking can be corrected. By doing this, as hand vibration, for example, a sine wave of vibration of about 1 to 10 Hz can be corrected.

The P driving actuator 16P has a pair of driving members 15 (15a, 15b). The driving members (first and second members) 15a and 15b are formed as a wire of a shape memory alloy (SMA) having a circular section and have, for example, the supply current-displacement characteristic of the SMA shown in FIG. 3. Namely, the SMA of the driving members 15, when the supply current reaches a current I1, is heated to the austenite transformation starting temperature, so that it starts deformation in the shrinkage direction and when the supply current reaches a current I2 for heating to the transformation ending temperature, it is restored to the memory shape, and the deformation is completed. Here, to raise the transformation ending temperature and ensure a good heat dissipation response (will be described later), it is preferable to use an SMA including titanium (Ti), nickel (Ni), and copper (Cu).

One end of each of the driving members 15a and 15b of the P driving actuator 16P is fixed to the upper part of the outer peripheral surface of the image pickup image 9 and the other end is fixed to the upper inner surface of the body-side member 12. And, the driving members 15a and 15b, as described later, expand and contract according to the heat value due to current impression and the image pickup unit 9 is driven in the pitch direction.

As described above, on both end sides of the image pickup unit 9 in the pitch direction, the driving members 15a and 15b fixed to both the body-side member 12 and image pickup unit 9 are installed. Namely, by the pair of driving members (hereinafter, may be referred to as "SMA actuators") 15a and 15b connected to the image pickup unit (moving part) 9 in a push-pull arrangement, the image pickup unit 9 can be driven.

The Y driving actuator 16Y has the same constitution as that of the P driving actuator 16P. Although not shown in FIG. 2, to make the image pickup unit 9 drive in the yawing direction, the Y driving actuator 16Y has a pair of driving members 15c and 15d (not drawn). The driving members 15c and 15b have the same constitution as that of the driving members 15a and 15b.

In detail, one end of the driving member 15c is fixed to the left side of the outer peripheral surface (this side of the paper surface) of the image pickup unit 9 and the other end is fixed to the inner surface of the left of the body-side member 12. Further, one end of the driving member 15d is fixed to the right side of the outer peripheral surface (the innermost side of the paper surface) of the image pickup unit 9 and the other end is fixed to the inner surface of the right of the body-side member 12. The driving members 15c and 15d, as described later, expand and contract according to the heat value due to current impression and the image pickup unit 9 is driven in the yawing direction.

Hereinafter, the drive principle of the P driving actuator 16P will be explained. Further, the same may be said with the Y driving actuator 16Y, so that to avoid duplication of explanation, the explanation thereof will be omitted.

Figure 4:
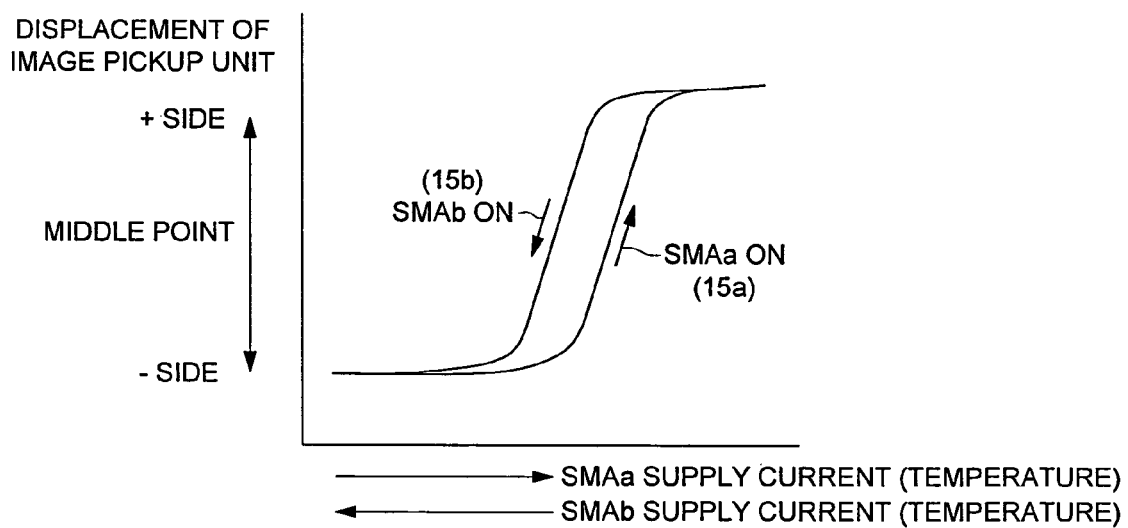
FIG. 4 is a drawing showing the relationship between the supply current to the SMA and the displacement of an image pickup unit 9.

FIG. 4 is a drawing showing the relationship between the supply current to the SMA and the displacement of an image pickup unit 9. Further, in the following explanation, FIGS. 5(a), 5(b), and 5(c) will be referred to properly.

A case that a comparatively large current (for example, the upper limit value of the supply current) is impressed to the SMA of the driving member 15b (hereinafter, may be referred to as "SMAb") and no current is impressed to the SMA of the driving member 15a (hereinafter, may be referred to as "SMAa") is supposed. In this case, the driving member 15b is heated and contracted and the driving member 15a is led to a comparatively low temperature and is put into an expendable state. Therefore, due to the contraction force of the driving member 15b, the driving member 15a enters the expanded state (FIG. 5(a)).

Figure 5:
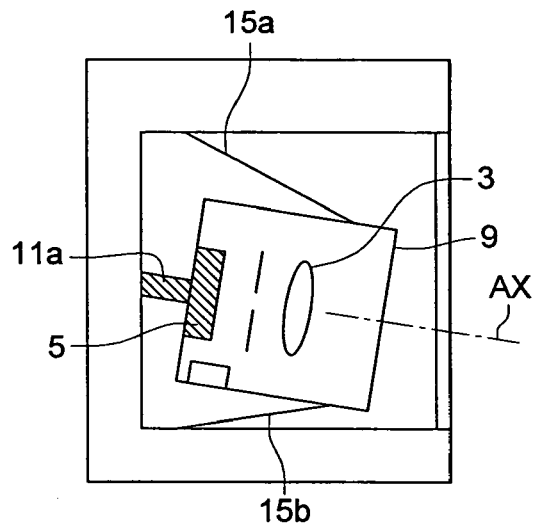
FIG. 5(a) is a drawing for explaining the relationship between the supply current to the SMA and the displacement of the image pickup unit 9.
FIG. 5(b) is a drawing for explaining the relationship between the supply current to the SMA and the displacement of the image pickup unit 9.
FIG. 5(c) is a drawing for explaining the relationship between the supply current to the SMA and the displacement of the image pickup unit 9.
Figure 5:
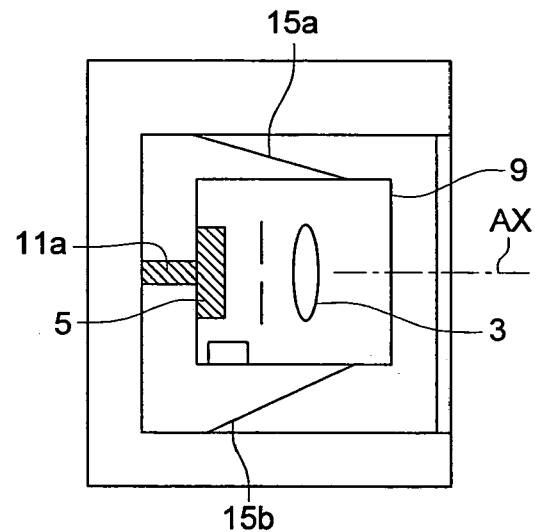
Figure 5:
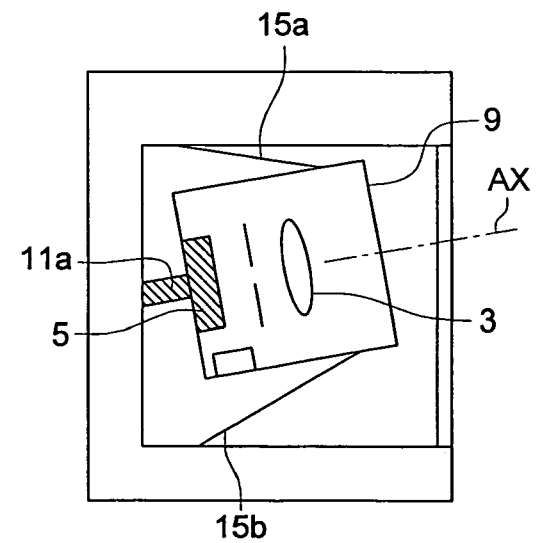

In this state, now, the supply current to the SMA of the driving member 15b is decreased and the supply current to the SMA of the driving member 15a is increased. Then, the driving member 15b enters the comparatively expandable state and moreover the contraction force of the driving member 15a is increased, so that the image pickup unit 9 slowly rotates counterclockwise around a predetermined rotational axis (for example, the axis RX in parallel with the axis X) to the body-side member 12. And, at the point of time when the force quantities of the SMAa and SMAb become almost equal to each other (the currents are almost the same), the driving members 15a and 15b become the same in length and as shown in FIG. 5(b), the image pickup unit 9 is moved to the reference position (center position) for driving the image pickup unit 9 so as to make the optical axis AX of the image pickup lens 3 parallel with the axis Z. And, the supply current to the SMA of the driving member 15a is increased more and the supply current to the SMA of the driving member 15b is decreased, thus the driving member 15a is contracted more and the driving member 15b is expanded more, so that as shown in FIG. 5(c), the incident plane side of the image pickup unit 9 is now inclined right upward.

Inversely, in the state shown in FIG. 5(c), when the supply current to the SMA of the driving member 15a is slowly decreased and the supply current to the SMA of the driving member 15b is slowly increased, the image pickup unit 9 is slowly rotated counterclockwise around the body-side member 12 and is moved to the state shown in FIG. 5(a) via the state shown in FIG. 5(b).

Therefore, the magnitude of supply currents to the pair of driving members 15a and 15b formed by expandable and contractable SMAs is controlled, thus the image pickup unit 9 can be driven in either of the positive and negative directions of the pitch direction.

Even when such a driving system is used, similarly to the aforementioned, the image pickup unit 9 is driven in the canceling direction of the vibration detected by the vibration sensor 8 installed in the image pickup unit 9 and is moved to the body-side member 12, thus the image shaking relating to the image pickup unit (image pickup means) 9 can be corrected.

Further, to enlarge the image stabilization drivable range, it is preferable to impress a predetermined current at time of image pickup and keep the image pickup unit 9 at the center position (refer to FIG. 5(b)).

Further, as shown in FIG. 4, when there is a hysteresis in the displacement operation of the image pickup unit 9 by the pair of SMAs, in the control system, it is desirable to decide an input voltage for compensating for such a hysteresis.

Figure 6:
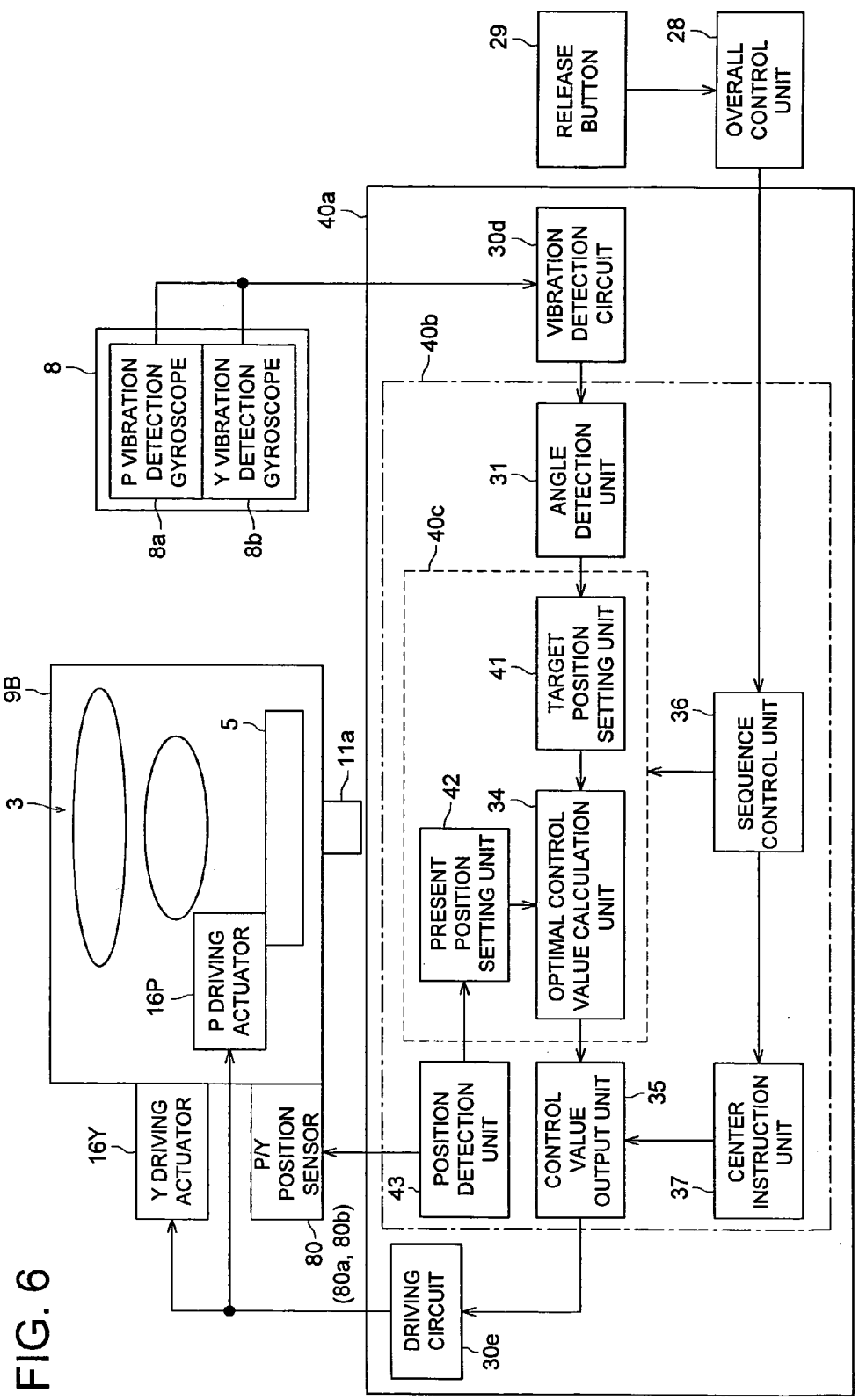
FIG. 6 is a drawing showing the outline of the control system concerning the image pickup process and image stabilization of the portable telephone 1.

FIG. 6 is a drawing showing the outline of the control system concerning the image pickup process and image stabilization of the portable telephone 1. As shown in FIG. 6, the vibration sensor 8 installed in the image pickup unit 9 supported by the elastic support unit 11a detects vibration of the image pickup unit 9. Concretely, the vibration sensor 8 includes a gyro-sensor (P vibration detection gyroscope) 8a for detecting the angular velocity (in detail, inertia angular velocity (ground angular velocity)) of the image pickup unit 9 in the pitch direction and a gyro-sensor (Y vibration detection gyroscope) 8b for detecting the angular velocity of the image pickup unit 9 in the yawing direction.

Output signals from the gyroscopes 8a and 8b of the vibration sensor 8 are input to a control unit 40a, are amplified by the vibration detection circuit 30d, are subject to the filtering process, then are detected as a signal indicating "vibration" of the image pickup unit 9, and are input to a digital control unit 40b.

The digital control unit 40b is composed of a microcomputer and controls driving of the image pickup unit (moving part) 9. A predetermined software program is executed in the microcomputer, thus the functions of the processing units including an angle detection unit 31, a target position setting unit 41, a present position setting unit 42, an optimum control value calculation unit 34, and a control value output unit 35 are realized. Further, the target position setting unit 41, present position setting unit 42, and optimum control value calculation unit 34 compose a servo control unit 40c.

The target position setting unit 41 converts the angle information detected by the angle detection unit 31 to position information corresponding to a position sensor 80 and sets a target position of the image pickup unit 9.

The present position setting unit 42 sets the position information detected by converting the output from the position sensor 80 by the position detection unit 43 as a present position of the image pickup unit 9. Here, the position sensor 8 includes a P position sensor 80a for detecting the position of an image pickup unit 9B in the pitch direction and a Y position sensor 80b for detecting the position of the image pickup unit 9B in the yawing direction. Further, the position sensor 80 is not necessary to include both one-dimensional position sensors 80a and 80b and it is possible to install one two-dimensional detection system position sensor.

And, the servo control unit 40c calculates a target position difference concerning the outputs of the target position setting unit 41 and present position setting unit 42 and calculates and outputs an optimal control value obtained by multiplying the target position difference by an optimum gain by the optimum control value calculation unit 34. By doing this, the image pickup unit 9 is moved in the canceling direction of the vibration detected by the vibration sensor 8, thus the image shaking can be corrected.

An overall control unit 28 is a part for generally controlling each unit of the portable telephone 1 and controls the overall sequence of the portable telephone 1. Further, the overall control unit 28 switches the image pickup mode for imaging using the image pickup unit 9 and the talking mode.

A release button 29 is formed as a pressing button. When the release button 29 is pressed by a user, the pressing is detected by the overall control unit 28 and a starting signal for the imaging operation and image stabilization is sent to a sequence control unit 36 from the overall control unit 28.

The sequence control unit 36 controls the sequence such as the imaging operation using the image pickup unit 9 and the image stabilization operation. Concretely, when the imaging mode is set by the overall control unit 28, it displays a live view image of a photographic object on the display unit 71 (LVON state). Further, when the release button 29 is pressed, it moves to the imaging state, performs the AF operation and AE operation, transmits a control signal to the servo control unit 40c, and starts the image stabilization operation. By the image stabilization operation, the sequence is controlled in the following order.

(1) The sequence control unit 36 fetches an angular velocity signal from the vibration detection circuit 30d, executes a predetermined integral, thereby detects the angle of the image pickup unit 9 by the angle detection unit 31, and sets a target position of the image pickup unit 9 to be driven for the angle by the target position setting unit 41.

(2) The sequence control unit 36 detects the position of the image pickup image 9 by the position sensor 80 and sets it as a present position by the present position setting unit 33.

(3) The sequence control unit 36 calculates an optimal control value by the optimal control value calculation unit 34 so as to set the present position as a target position and drives the driving unit 16 via the control value output unit 35. By doing this, on the basis of the deviation concerning the target position (driving target value) and the present position (measurement value), a current is supplied to the driving member (SMA wire) 15, and the driving of the image pickup unit 9 is serve-controlled appropriately.

The aforementioned operations (1) to (3) are repeated until an image stabilization stop instruction is issued, thus the image shaking can be corrected appropriately.

A center instruction unit 37 is a part for holding the image pickup unit 9 at the center position shown in FIG. 5(b), stores information of applied voltages to the driving members 15a to 15d necessary for center holding at the normal temperature, and instructs the applied voltages of the driving members on the basis of the information. Further, with respect to the applied voltage information of each driving member, since the applied voltage necessary for center holding varies with the condition of the image pickup unit 9, it is preferable to confirm and store the applied voltage information in consideration of it before shipment at factory.

As mentioned above, the control unit 40a generates a control instruction value for driving the image pickup unit 9 in the canceling direction for the vibration detected by the vibration detection circuit 30d using the servo control unit 40c and control value output unit 35 and outputs it to a driving circuit (driver) 30e. The driving circuit 30e has, for example, a 2-channel linear driver (driver for supplying an output voltage proportional to the input) and drives the driving unit 16 on the basis of the control instruction value from the digital control unit 40b. By doing this, the image pickup unit 9 is driven relatively to the body-side member 12 and the image shaking is corrected.

Further, in the portable telephone 1, although not drawn, as a processing unit for handling an image obtained by picking up a photographic object by the image pickup unit 9, an A-D converter, an image processing unit, and an image memory are installed. Namely, an image of an analog signal obtained by the image pickup device 5 is converted to a digital signal by the A-D converter, is subject to a predetermined image process by the image processing unit, and then is stored temporarily in the image memory. The image stored in the image memory is recorded in a memory card as a recording image or is displayed on the display unit 71 as a live view display image. In this way, by the image processing unit, image data is generated on the basis of an output signal from the image pickup device. The respective processes concerning image generation are performed under the control of the overall control unit 28.

<Operation of Image Stabilization System 10>

Figure 7:
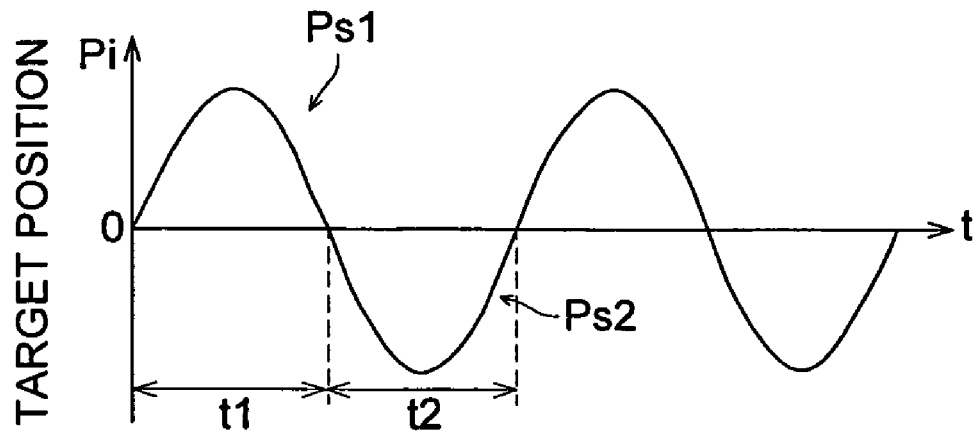
FIG. 7(a) is a drawing for explaining the operation of the image stabilization system 10.
FIG. 7(b) is a drawing for explaining the operation of the image stabilization system 10.
Figure 7:
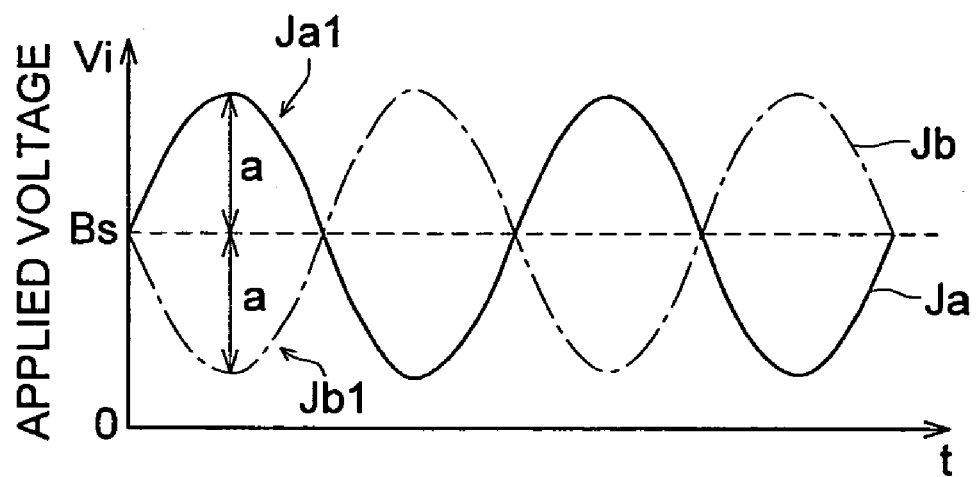

FIGS. 7(a) and 7(b) are drawings for explaining the operation of the image stabilization system 10. Here, FIG. 7(a) shows a signal waveform of the target position and FIG. 7(b) shows signal waveforms Ja and Jb of the applied voltages to the SMAa and SMAb. Further, the axis of ordinate shown in FIG. 7(a) indicates a movement quantity (displacement quantity) in the direction of the + side when the middle point is assumed as Pi=0.

The control unit 40a of the image stabilization system 10, when the target position signal of a sine wave shown in FIG. 7(a) is set, generates a driving control signal for supplying a voltage to the SMAa like the waveform Ja shown in FIG. 7(b) and also generates a driving control signal for supplying a voltage to the SMAb like the waveform Jb shown in FIG. 7(b). The driving circuit 30e supplies continuously a current to the SMAa and SMAb on the basis of the signal waveforms Ja and Jb, thereby can give a continuous displacement to the image pickup unit 9. The characteristics of the signal waveforms Ja and Jb will be explained below.

Figure 3:
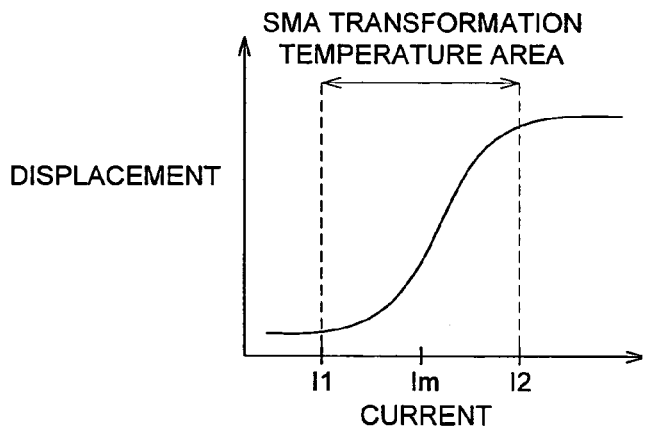
FIG. 3 is a drawing showing the characteristic of supply current-displacement of the SMA.

The signal waveforms Ja and Jb are an analog signal for setting a fixed DC voltage necessary to supply the current in the SMA transformation temperature area shown in FIG. 3 as a bias voltage Bs and amplifying according to the target position signal shown in FIG. 7(a) on the basis of the bias voltage Bs. The bias current is set to a current necessary to heat to a specific temperature within the temperature range from the transformation starting temperature of the SMA to the transformation ending temperature thereof and for example, in the SMA transformation temperature area shown in FIG. 3, a current Im which is an intermediate value of the currents I1 and I2 which is upper and lower limit values is set.

When a signal waveform Ps1 for displacing the image pickup unit 9 on the + side in the time zone t1 (FIG. 7(a)) is input, the control unit 40a, regarding the SMAa requiring the contraction operation, outputs a driving control signal obtained by adding a voltage proportional to the signal waveform Ps1 like the signal waveform Ja1 shown in FIG. 7(b) to the bias voltage Bs to the driving circuit 30e.

On the other hand, regarding the SMAb expanded without contracted, when the heat dissipation speed of the SMA is equal to the heating speed, in the time zone t1, like the signal waveform Jb1 shown in FIG. 7(b), the voltage a added from the bias voltage Bs in the signal waveform Ja1 is subtracted from the bias voltage Bs.

The bias voltage Bs is set in this way and the SMA on the expansion side is prevented from excessive cooling, thus even in the case of next heating (time zone t2 shown in FIG. 7(a)), the time lag of heating can be reduced and the response can be improved.

<Wire Diameter of Driving Member 15>

In the driving member 15, in consideration of the restrictions due to (1) driving force, (2) mountability, and (3) response, it is necessary to uses an SMA with an appropriate wire diameter. Hereinafter, the restrictions will be explained sequentially.

(1) Driving Force

The driving force (maximum driving force) which can be generated by the SMA is almost proportional to the sectional area of the SMA and for example, the maximum driving force of the SMA with a diameter of 40 μm is about 0.6 N (strength of about 60 g) when measured. Here, in the servo mechanism such as the image stabilization system 10, to ensure the target image stabilization performance, in consideration of variations between the individuals of the driving mechanism, frictional force, and posture, in the SMA with a diameter of 40 μm, driving a moving part of about 5 g is a limit.

On the other hand, in the image stabilization system 10, it is difficult to reduce the weight of the moving part to about 0.5 g or less and to drive surely the moving part of 0.5 g, from the measurement values for the wire diameter of 40 μm, a wire diameter of 12.6 ($=40\times\sqrt{(0.5/5)}$) μm is necessary.

From the aforementioned, to ensure appropriate driving force in image stabilization, it is desirable to set the wire diameter of the SMA to about 15 μm or more.

(2) Mountability

When using the SMA as an actuator, as shown in FIG. 2, it is necessary to fix and mount both ends of each of the SMAs (driving members 15a and 15b). In this case, to mount the SMAs at stable strength, a wire diameter of 10 μm or more is necessary. A wire diameter of less than 10 μm is too thin, so that the operability is bad and it is difficult to fix the SMAs by giving fixed stress.

(3) Response

In the image stabilization system 10, as mentioned above, the bias voltage Bs is impressed to the SMAa and SMAb, thus the response is improved, though the SMA on the expansion side different from the expansion and contraction side requires heat dissipation.

With respect of heat dissipation of the SMA, since the heat dissipation response (heat dissipation speed) is above proportional to the sectional area of the SMA, the thin SMA having a small sectional area realizes good heat dissipation.

For example, when the SMA with a diameter of 40 μm is measured, at an environmental temperature of 25° C. (normal temperature), a heat dissipation response of about 50 Hz is obtained, though at a higher temperature of 60° C., the heat dissipation response is reduced to about 40 Hz and is degraded by about 20%.

Therefore, to ensure the response (for example, a response of about 10 Hz at a high temperature) necessary for the image stabilization system 10, in consideration of that the response is proportional to the sectional area of the SMA, it is necessary to set the wire diameter of the SMA to 80 $(=40\times\sqrt{(40/10)})$ μm or less.

With respect to the response aforementioned, a concrete example will be explained below. Firstly, measured data relating to the frequency characteristics of the SMA actuator will be explained.

Figure 8A:
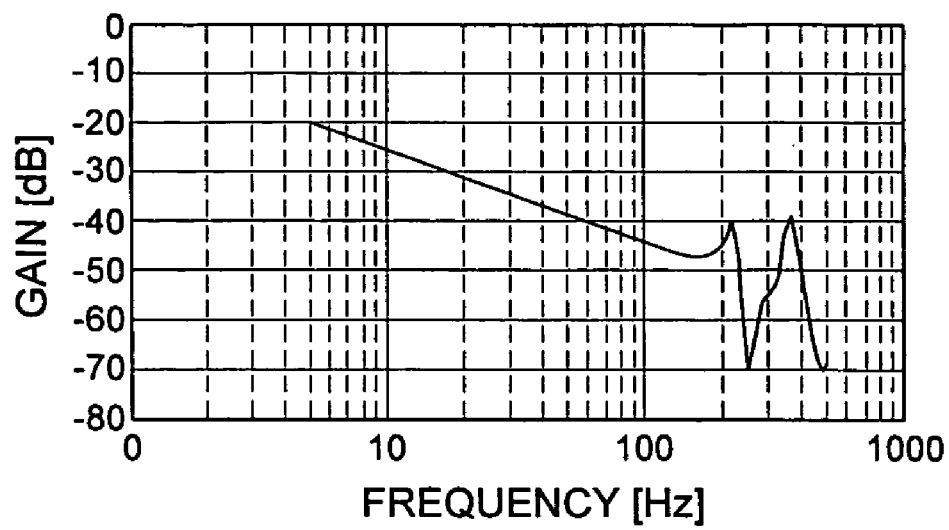
FIG. 8(a) is a drawing showing the gain characteristic of the SMA actuator having a wire diameter of 40 μm.
Figure 8B:
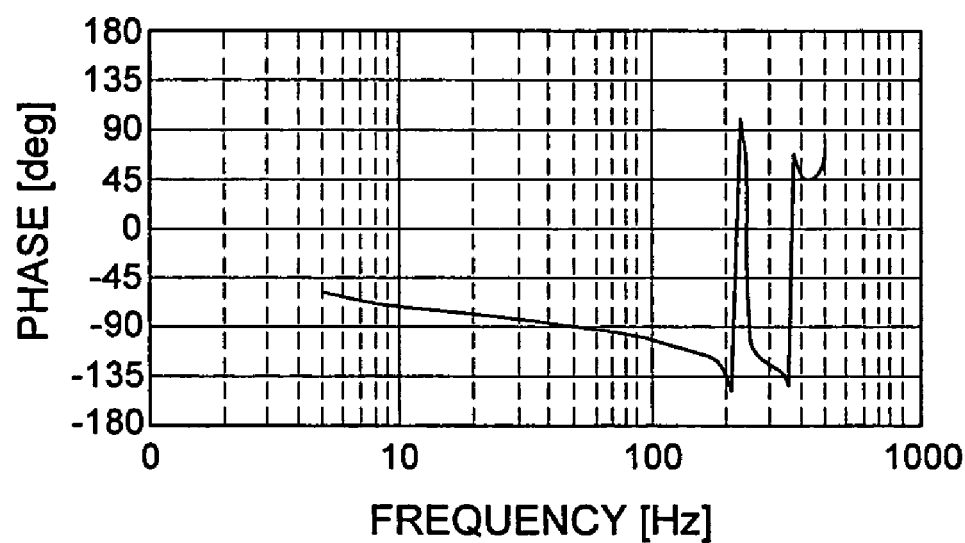
FIG. 8(b) is a drawing showing the phase characteristic of the SMA actuator having a wire diameter of 40 μm.

FIGS. 8(a) and 8(b) are drawings showing the frequency characteristics of the SMA actuator with a wire diameter of 40 μm. FIGS. 8(a) and 8(b) show the gain characteristic and phase characteristic of the open loop of the rotation driving mechanism equipped with the SMA actuator of push-pull arrangement.

In the frequency characteristics shown in FIGS. 8(a) and 8(b), the process is shifted in a primary delay system up to about 100 Hz and since the mechanical resonance point of the driving system is 200 Hz or more, at a frequency of 10 Hz necessary for image stabilization, a driving performance of an supply current 10 times of the gain (the correction performance of ¹⁄₁₀) can be ensured. The frequency characteristics with a wire diameter of 40 μm are desirable characteristics as an image stabilization system.

Next, the driving mechanism (hereinafter, may be referred to as "linear driving mechanism") for linearly driving the moving part by the SMA actuator of push-pull arrangement is simulated and the response of the SMA actuator will be considered.

Figure 9:
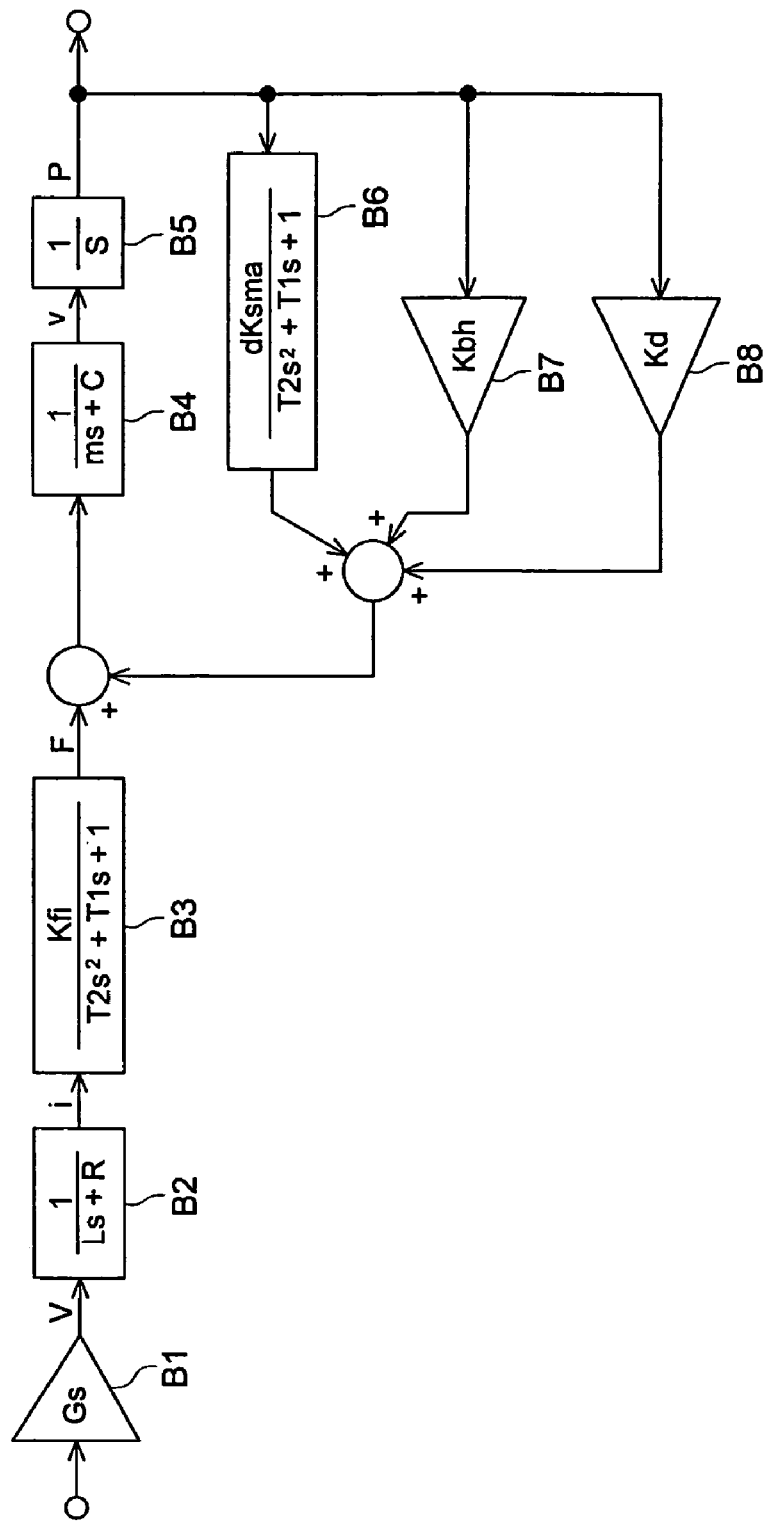
FIG. 9 is a block diagram showing a model of the driving mechanism used for simulation.
Figure 10:
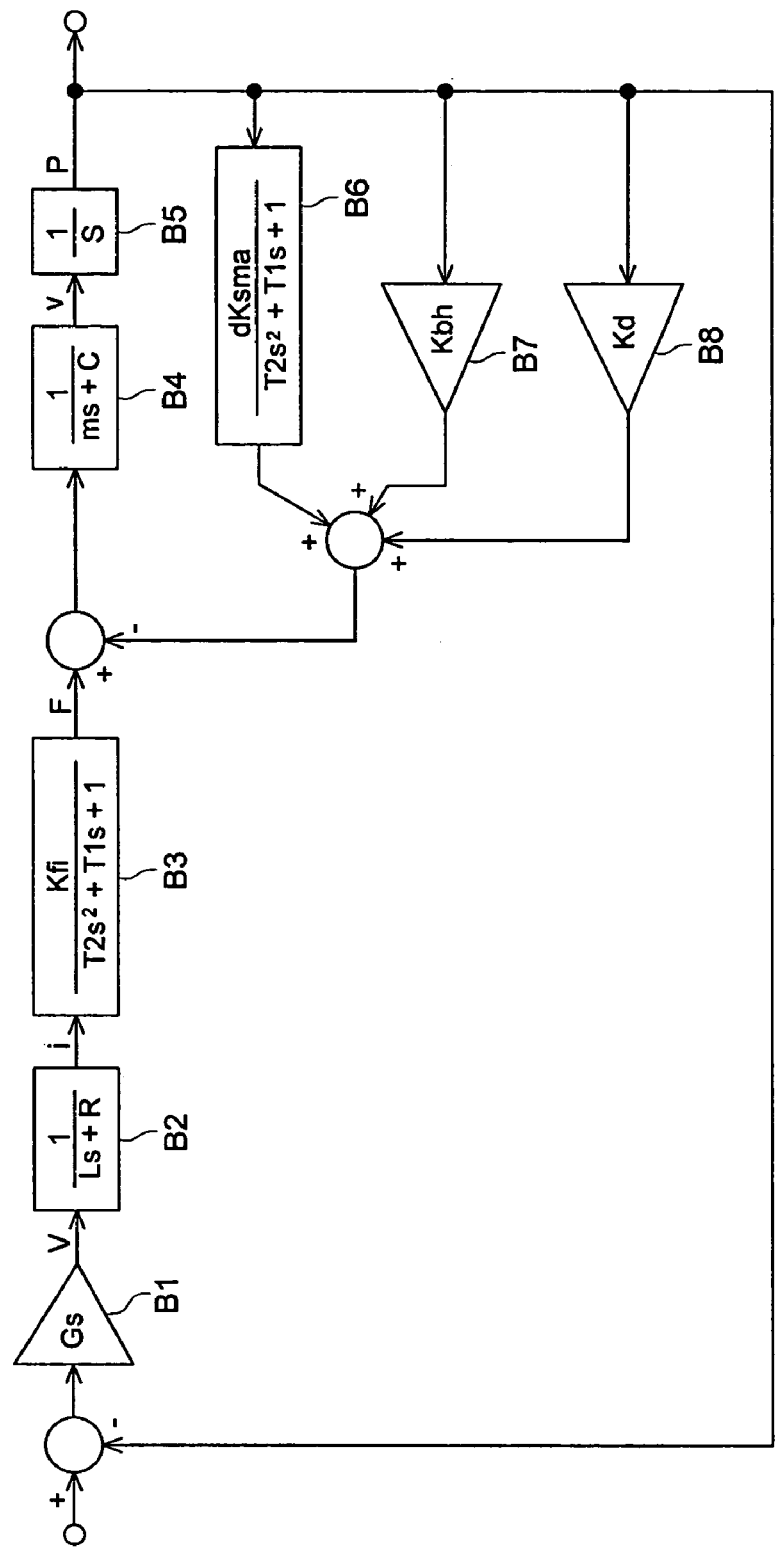
FIG. 10 is a block diagram showing a position servo model of the driving mechanism used for simulation.

FIG. 9 is a block diagram showing a model of the driving mechanism used for simulation. Further, FIG. 10 is a block diagram showing a position servo model of the driving mechanism used for simulation. Hereinafter, the models of the driving mechanism will be explained briefly.

Firstly, when a control signal is input, the voltage V amplified by a servo amplifier B1 is outputted. Next, when the voltage V is impressed to the SMA actuator, a current i flows on the basis of a characteristic B2 of the SMA and force F according to the current i is generated on the basis of characteristic B3 of the SMA. Here, the SMA actuator passes through the process of generation of current→generation of heat→driving force, so that the characteristic B3 is defined as a secondary delay system. And, the force F generated by the SMA acts on the moving part, so that a driving speed v based on a driving characteristic B4 of the moving part is generated, and an integral B5 is executed for the driving speed v, and a position P of the moving part is obtained.

A block B6 has a coefficient dKsma indicating the difference in the spring constant between at time of bias heating (at time of impression of the bias voltage) and at time of control heating in the SMA actuator. Therefore, the characteristic of increasing the spring constant of the SMA itself when the SMA actuator is heated can be reflected to simulation.

Further, a proportional constant Kbh of a block B7 indicates a spring constant of the SMA actuator at time of bias heating and a proportional constant Kd of a block B8 indicates a spring constant of the damping spring. The damping spring, for example, is installed in parallel with the SMA actuator like a plate spring (drawn by a dashed line) Sd shown in FIG. 2.

The SMA actuator is simulated on the basis of the models explained above and the parameters set in the simulation will be explained below.

Diameter of SMA lsma=40 [μm];
Radius of SMA rs=lsma/2,
Weight of moving part m=0.001 [kg],
Reference radius of SMA rsφ=19,
Viscosity dynamic friction coefficient concerning moving part C=0.4

SMA inter-terminal resistance R=15×rsφ²/rs² [Ω] (The inter-terminal resistance R is inversely proportional to the sectional area of the SMA when the SMA length is fixed.), SMA inductance L=0.7×10⁻⁶ [H], Power constant Kfi=5.0×rs²/rsφ² (The power constant Kfi is proportional to the sectional area of the SMA.),

T1=1,

Response frequency corresponding to time constant when driving force of SMA is generated ft2=30×19³/rs³ (A model proportional to the cube of the radius of the SMA is supposed in the secondary delay system and ft2 is set to 30 Hz in the 40-μm SMA.)

T2=1/(2π×ft2)²,

Damping spring constant Kd=350 [N/m]

SMA spring constant at bias heating Kbh=300×(rs²/rsφ²) [N/m], dKsma=300×(rs²/rsφ²) [N/m], Gain Gs of servo amplifier (Even if the wire diameter of the SMA is changed, the 10-Hz gain of the frequency characteristic of the open loop is set to be about 20 dB (10 times).)

Figure 11A:
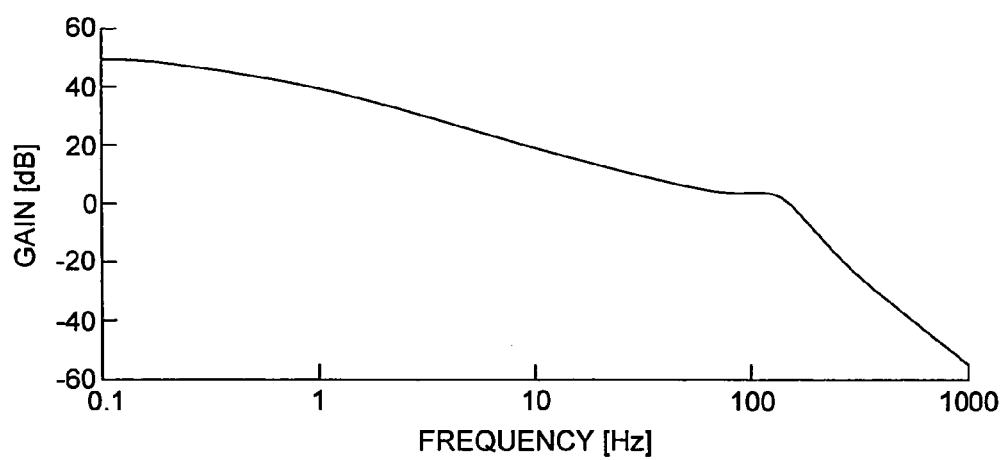
FIG. 11(a) is a drawing showing the gain characteristic as a result of simulation concerning the SMA actuator having a wire diameter of 40 μm.
Figure 11B:
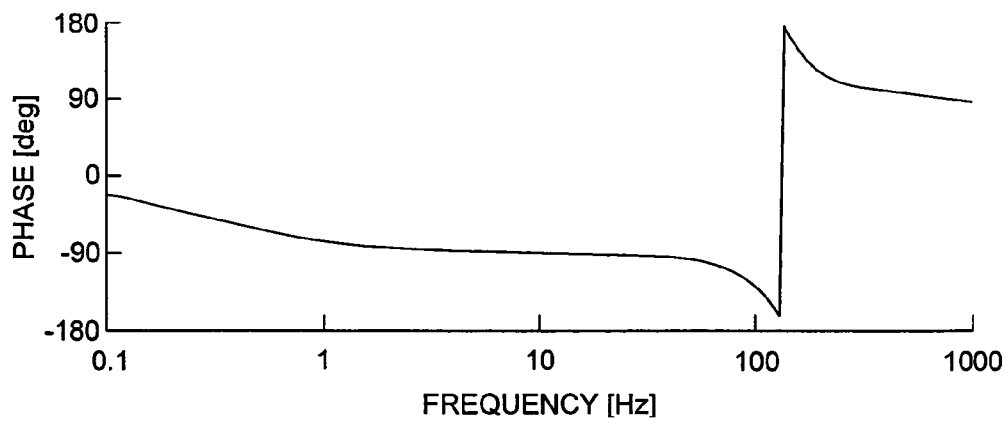
FIG. 11(b) is a drawing showing the phase characteristic as a result of simulation concerning the SMA actuator having a wire diameter of 40 μm.

The simulation results concerning the SMA actuator with a wire diameter of 40 μm in which the parameters are set in this way are shown in FIGS. 11(a) and 11(b). The simulation results show that similarly to the measured results of the SMA actuator with a wire diameter of 40 μm shown in FIGS. 8(a) and 8(b), the process is shifted in the primary delay system up to the neighborhood of about 100 Hz and it is suitable for image stabilization.

Figure 12A:
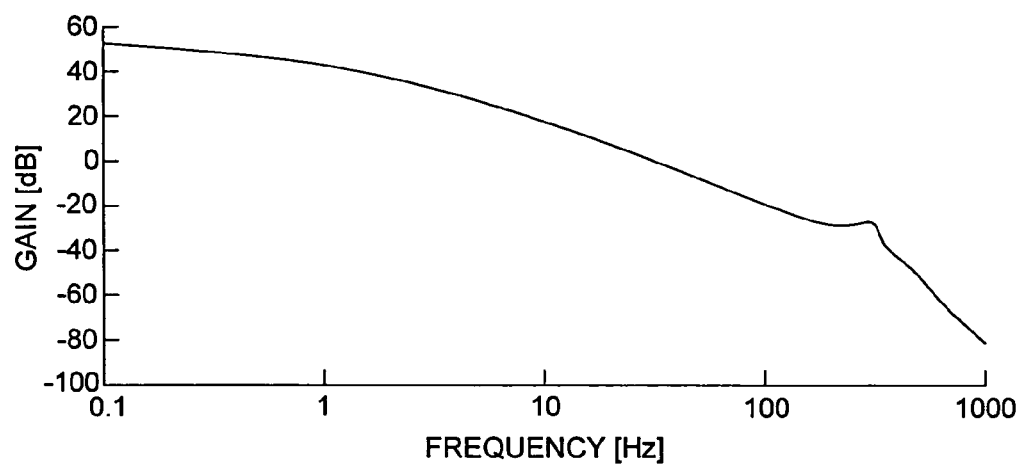
FIG. 12(a) is a drawing showing the gain characteristic as a result of simulation concerning the SMA actuator having a wire diameter of 120 μm.
Figure 12B:
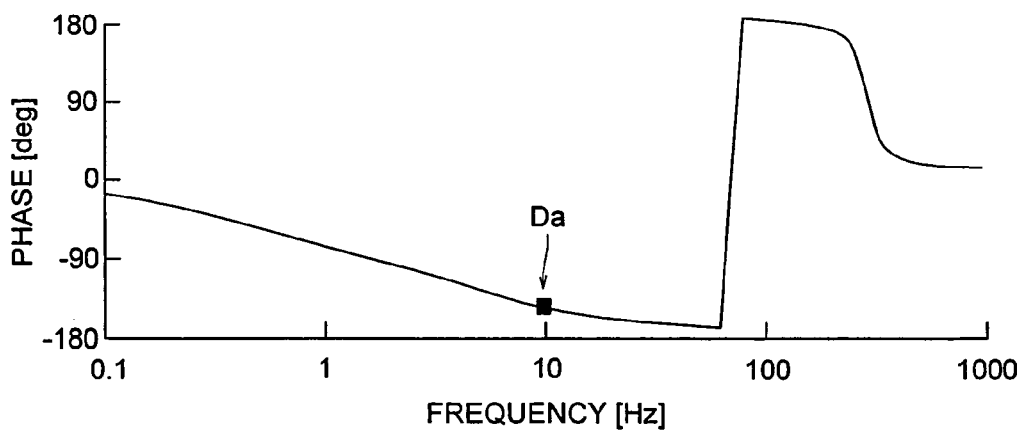
FIG. 12(b) is a drawing showing the phase characteristic as a result of simulation concerning the SMA actuator having a wire diameter of 120 μm.

Next, the simulation results when the wire diameter lsma of the SMA actuator is set to 120 μm in the aforementioned models are shown in FIGS. 12(a) and 12(b). In the simulation results, a phase lag of about 180° (refer to the point Da on the graph shown in FIG. 12(b)) is generated in the neighborhood of 10 Hz and no necessary image stabilization performance is obtained. The reason that compared with the wire diameter of 40 μm, the response is degraded like this is that in the SMA actuator on the current supply off side (heat dissipation side), in the case of the wire diameter of 120 μm, the heat dissipation response is lowered.

FIG. 13 is a drawing showing the simulation results of the position servo model concerning the SMA actuator with a wire diameter of 40 μm.

Figure 13A:
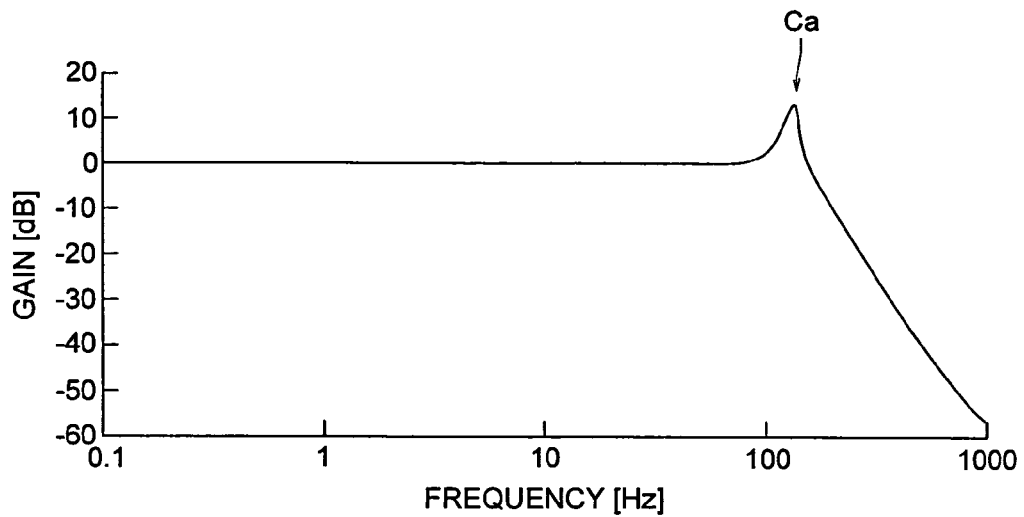
FIG. 13(a) is a drawing showing the gain characteristic as a result of simulation of the position servo model concerning the SMA actuator having a wire diameter of 40 μm.
Figure 13B:
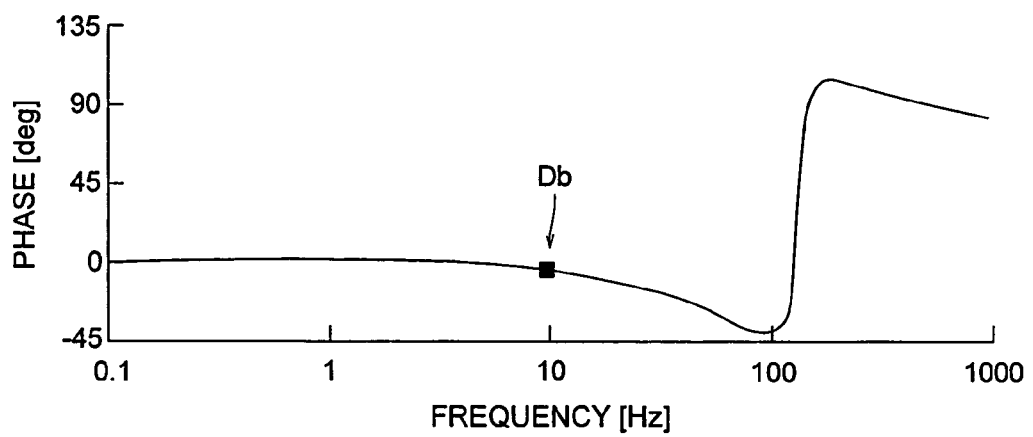
FIG. 13(b) is a drawing showing the phase characteristic as a result of simulation of the position servo model concerning the SMA actuator having a wire diameter of 40 μm.

As shown in FIGS. 13(a) and 13(b), in the driving mechanism, the position feedback (serve control) of the moving part is performed, so that compared with the open control shown in FIGS. 11(a) and 11(b), the frequency characteristic up to 100 Hz is improved. Further, since the wire diameter is 40 μm, the heat dissipation response by the SMA actuator on the heat dissipation side is good, and the phase lag in the neighborhood of 10 Hz is suppressed to about 7° (refer to the point D6 on the graph shown in FIG. 13(b)), thus the target image stabilization response (for example, the phase lag at 10 Hz is less than 8°) is satisfied. Further, from the relationship between the weight of the moving part and the spring component, mechanical resonance Ca is generated in the neighborhood of about 120 Hz. However, it is resonance at a higher frequency than the frequency necessary for image stabilization, so that it can be improved by a mechanism damper.

Figure 14A:
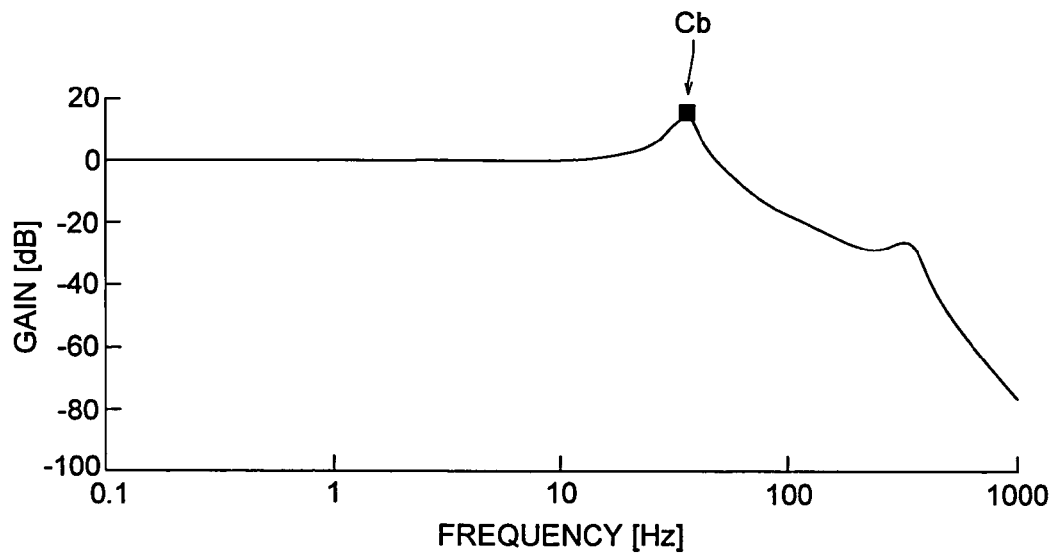
FIG. 14(a) is a drawing showing the gain characteristic as a result of simulation of the position servo model concerning the SMA actuator having a wire diameter of 120 μm.
Figure 14B:
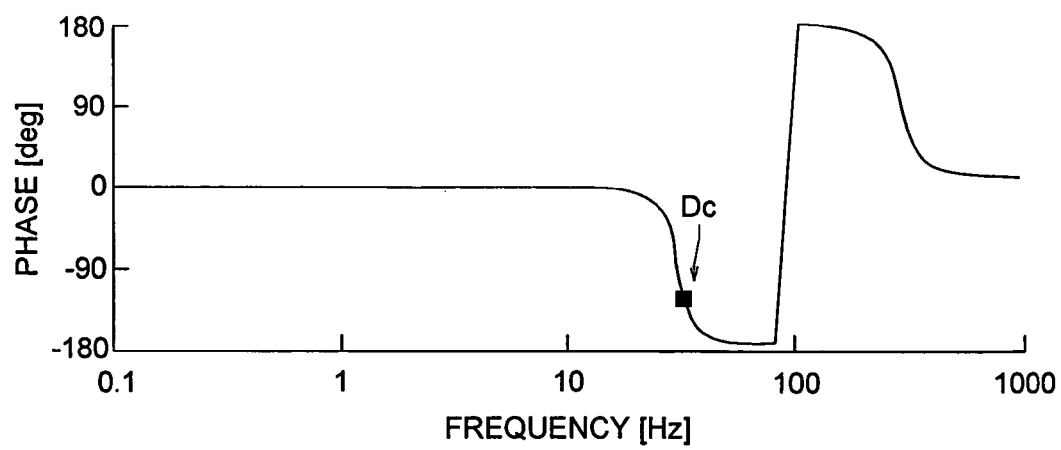
FIG. 14(b) is a drawing showing the phase characteristic as a result of simulation of the position servo model concerning the SMA actuator having a wire diameter of 120 μm.

FIGS. 14(a) and 14(b) are drawings showing the simulation results of the position servo model concerning the SMA actuator with a wire diameter of 120 μm.

As shown in FIGS. 14(a) and 14(b), in the SMA actuator with a wire diameter of 120 μm, even if the feedback control is executed, since the heat dissipation response of the SMA actuator on the heat dissipation side is slow, at about 30 Hz, the phase lag reaches 180° (refer to the point Dc on the graph shown in FIG. 14(b)), thus the phase is reversed, and resonance Cb is generated. The resonance Cb is caused by the heat dissipation response of the SMA actuator, so that the improvement thereof is difficult. Further, the frequency at which the resonance Cb is generated is close to a frequency between 10 and 20 Hz necessary for image stabilization, so that when the mechanism damper is used, the necessary image stabilization performance is degraded.

In the rotation driving mechanism that the moving part is rotated around a predetermined axis (for example, the central axis of the moving part) by the SMA actuator of push-pull arrangement, in proportion to the distance between the central axis aforementioned and the action point of the SMA actuator, the equivalent weight (apparent weight) of the moving part is decreased. Therefore, the simulation results of the rotation driving mechanism that the equivalent weight of the moving part is $\frac{1}{10}$ times will be explained.

Figure 15A:
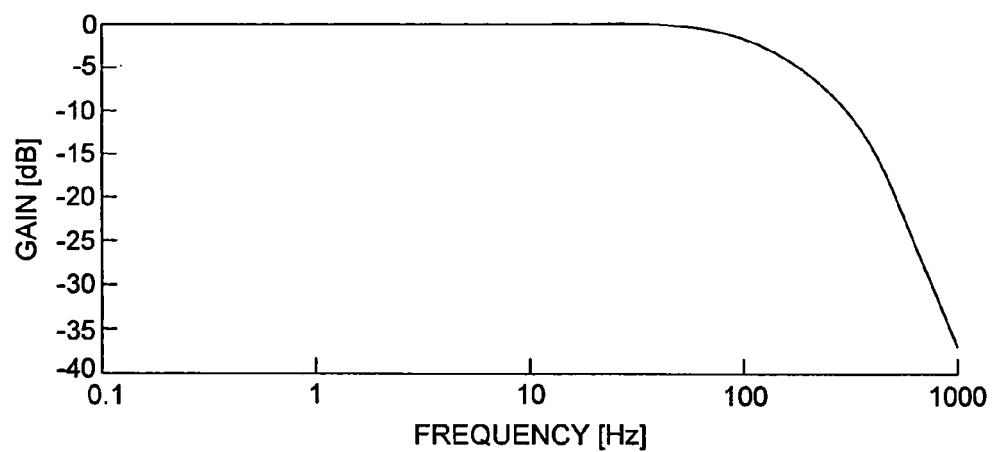
FIG. 15(a) is a drawing showing the gain characteristic as a result of simulation of the rotation driving mechanism using the SMA actuator having a wire diameter of 40 μm.
Figure 15B:
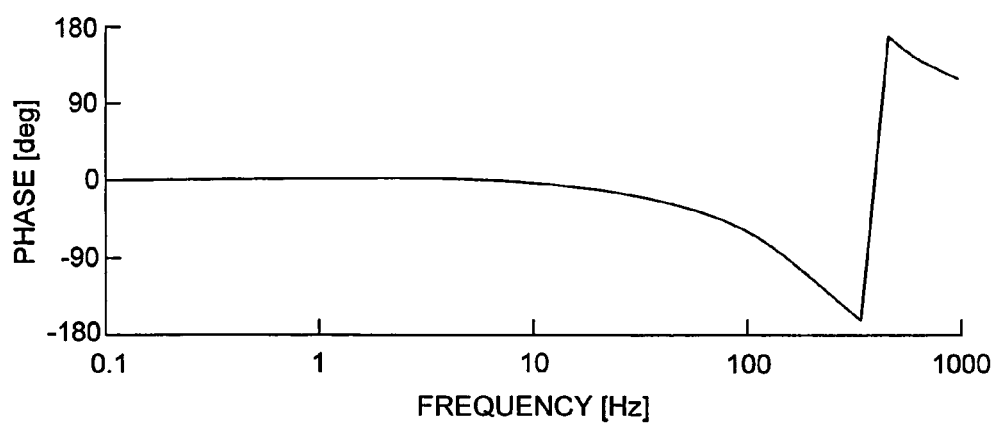
FIG. 15(b) is a drawing showing the phase characteristic as a result of simulation of the rotation driving mechanism using the SMA actuator having a wire diameter of 40 μm.

FIGS. 15(a) and 15(b) are drawings showing the simulation results of the rotation driving mechanism using the SMA actuator with a wire diameter of 40 μm.

As shown in FIGS. 15(a) and 15(b), in the rotation driving mechanism, the resonance Ca by the linear driving mechanism shown in FIGS. 13(a) and 13(b) is not generated and the response is good up to the neighborhood of 100 Hz. By use of the rotation driving mechanism in this way, the equivalent weight of the moving part is reduced as mentioned above, so that the frequency characteristic can be improved compared with the linear driving mechanism.

Figure 16A:
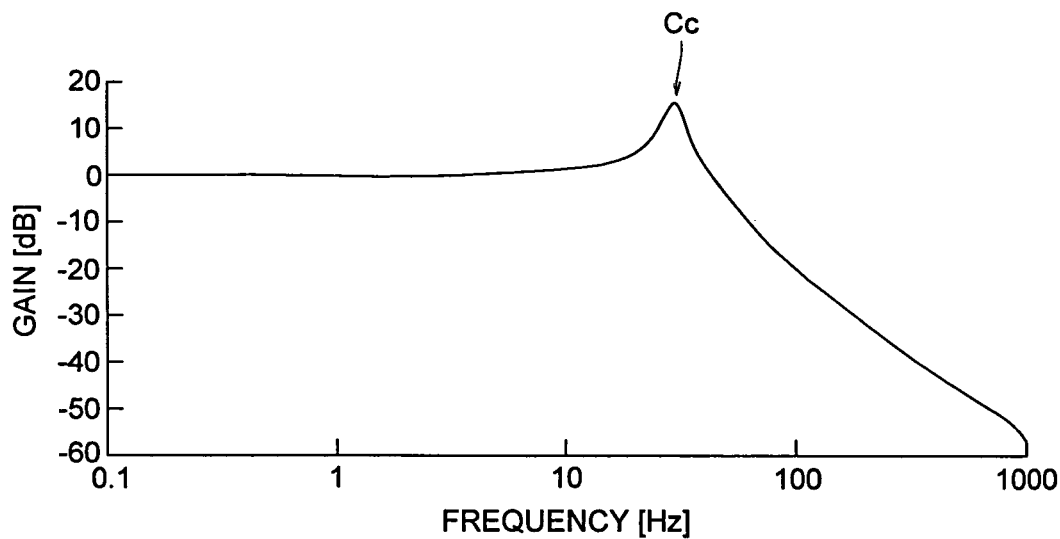
FIG. 16(a) is a drawing showing the gain characteristic as a result of simulation of the rotation driving mechanism using the SMA actuator having a wire diameter of 120 μm.
Figure 16B:
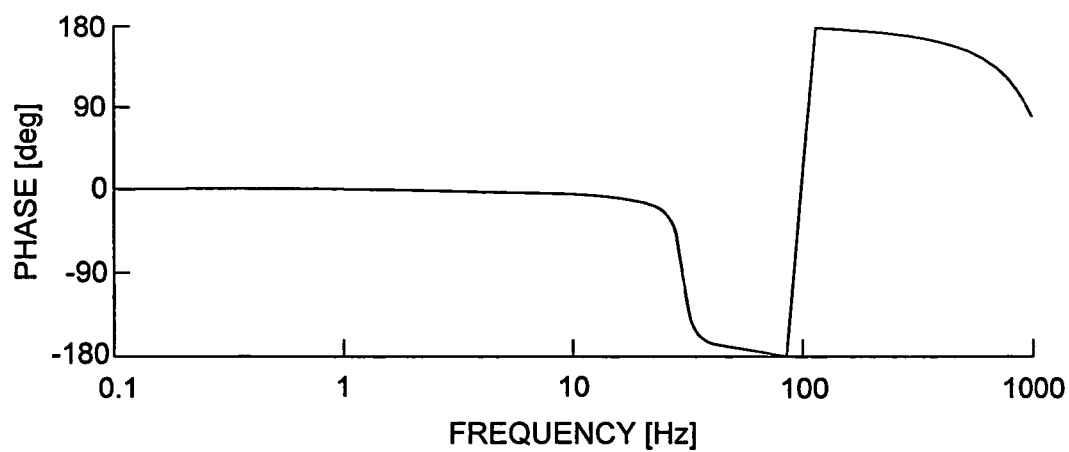
FIG. 16(b) is a drawing showing the phase characteristic as a result of simulation of the rotation driving mechanism using the SMA actuator having a wire diameter of 120 μm.

FIGS. 16(a) and 16(b) are drawings showing the simulation results of the rotation driving mechanism using the SMA actuator with a wire diameter of 120 μm.

FIGS. 16(a) and 16(b) show that in the SMA actuator with a wire diameter of 120 μm, even in the rotation driving mechanism, similarly to the linear driving mechanism shown in FIGS. 14(a) and 14(b), resonance Cc is caused by the heat dissipation response of the SMA actuator in the neighborhood of 30 Hz, thus it is not suited to image stabilization.

When the aforementioned simulation results are summarized, from the viewpoint of response, it is found that the wire diameter of the SMA actuator is preferably set to 40 μm or less and the rotation driving mechanism is suitably adopted.

As explained above, in each SMA actuator of the image stabilization system 10, when the diameter thereof is set between 10 μm and 80 μm (when it is converted to a sectional area, between 80 ($\approx \pi 5^2$) μm$^2$ and 5030 ($\approx \pi 40^2$) μm$^2$), the mountability and response can be improved appropriately. Furthermore, when the diameter of each SMA actuator is limited between 15 μm and 40 μm (when it is converted to a sectional area, between 180 ($\approx \pi 7.5^2$) μm$^2$ and 1260 ($\approx \pi 20^2$) μm$^2$), the response can be improved more and appropriated driving force can be ensured for image stabilization. Further, when the rotation driving mechanism is driven by the SMA actuator, the response can be improved more.

Further, in the control of the image stabilization system 10, it is not essential to execute the analog drive control shown in FIGS. 7(a) and 7(b) and either of the two control methods explained below may be performed.

(1) Thinning-Out Control

Figure 17A:
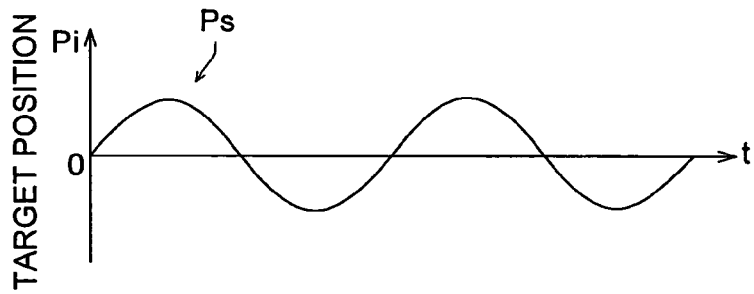
FIG. 17(a) is a drawing showing a signal waveform of the target position during the thinning-out control operation of the image stabilization system 10.
Figure 17B:
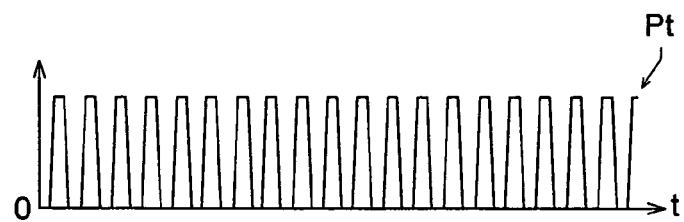
FIG. 17(b) is a drawing showing a pulse signal Pt during the thinning-out control operation of the image stabilization system 10.
Figure 17C:
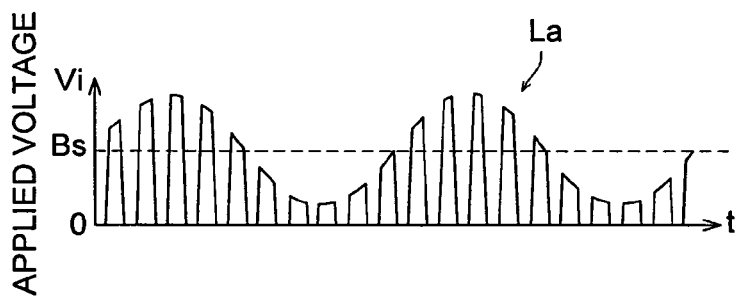
FIG. 17(c) is a drawing showing a signal waveform La of the applied voltage to an SMAa during the thinning-out control operation of the image stabilization system 10.
Figure 17D:
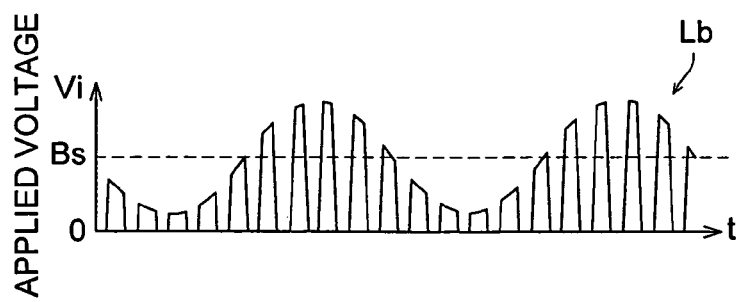
FIG. 17(d) is a drawing showing a signal waveform Lb of the applied voltage to an SMAb during the thinning-out control operation of the image stabilization system 10.

FIGS. 17(a), 17(b), 17(c), and 17(d) are drawings for explaining the operation of thinning-out control of the image stabilization system 10. Here, FIG. 17(a) shows a signal waveform of the target position and FIG. 17(b) shows a pulse signal Pt. Further, FIGS. 17(c) and 17(d) show signal waveforms La and Lb of the applied voltages to the SMAa and SMAb.

In the digital control unit 40b, on the basis of the target position signal Ps shown in FIG. 17(a), the signal waveforms Ja and Jb to be impressed to the SMAs as shown in FIG. 7(b) are generated.

And, a process of superimposing these signal waveforms Ja and Jb and the pulse signal Pt (FIG. 17(b)) which is a partial signal prepared inside the digital control unit 40b is performed, thus a driving waveform La of the SMAa shown in FIG. 17(c) and a driving waveform Lb of the SMAb shown in FIG. 17(d) are generated. The pulse signal Pt has a frequency to which the SMA reacts (responds) little, for example, 1 kHz or higher.

Voltages are impressed to the SMAa and SMAb on the basis of the signal waveforms La and Lb which are thinned out using the pulse signal Pt in this way, so that the supply power can be reduced in accordance with the ratio (duty ratio) between the on time and the off time of the pulse signal Pt. Further, when the duty ratio equivalent to the thinning rate is decreased, the power enough to displace the SMA to the target position cannot be supplied, thus the performance is lowered, so that the duty ratio is set so that the mean value of supply currents per unit time is controlled in the SMA transformation temperature area shown in FIG. 3.

As mentioned above, the driving current signal of the SMA is thinned out, thus power conservation in the image stabilization system 10 can be realized.

(2) PWM Drive Control

Figure 18A:
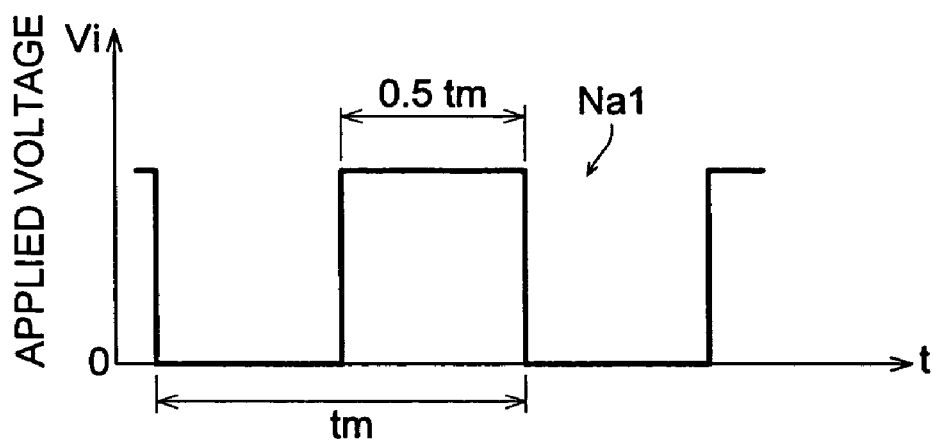
FIG. 18(a) is a drawing showing a signal waveform Na1 of the applied voltage to the SMAa under the PWM control of the image stabilization system 10.
Figure 18B:
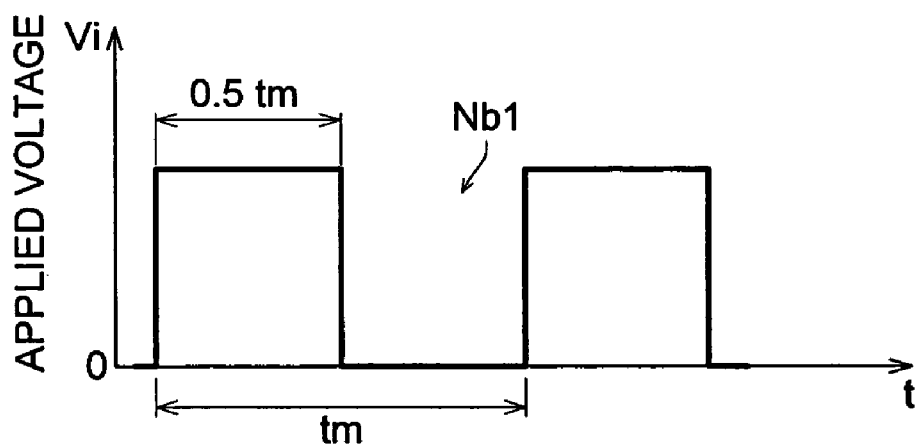
FIG. 18(b) is a drawing showing a signal waveform Nb1 of the applied voltage to the SMAa under the PWM control of the image stabilization system 10.
Figure 19A:
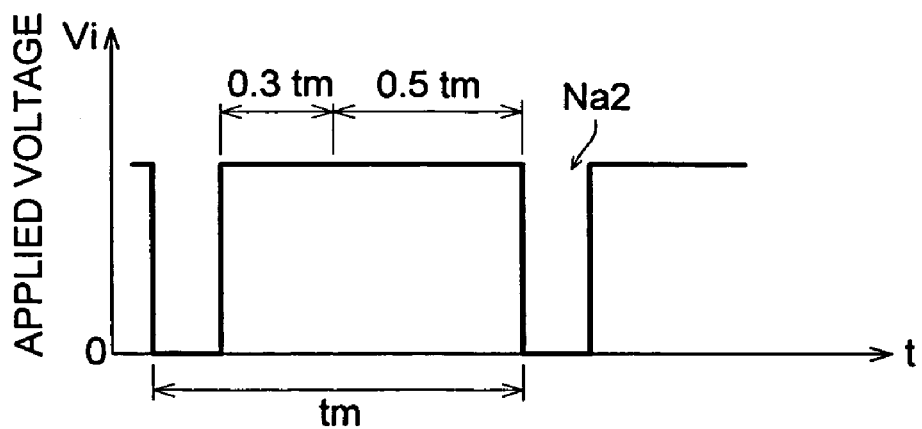
FIG. 19(a) is a drawing showing a signal waveform Na2 of the applied voltage to the SMAb under the PWM control of the image stabilization system 10.
Figure 19B:
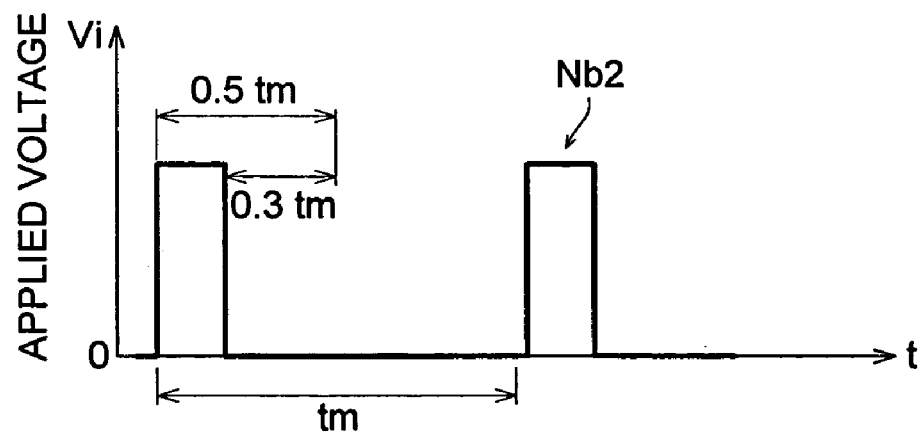
FIG. 19(b) is a drawing showing a signal waveform Nb2 of the applied voltage to the SMAb under the PWM control of the image stabilization system 10.

FIGS. 18(a) and 18(b) and FIGS. 19(a) and 19(b) are drawings for explaining the operation of PWM control of the image stabilization system 10. Here, FIGS. 18(a) and 19(a) show signal waveforms Na1 and Na2 of the applied voltages to the SMAa and FIGS. 18(b) and 19(b) show signal waveforms Nb1 and Nb2 of the applied voltages to the SMAb.

In the digital control unit 40b, on the basis of a pulse signal (PWM), an applied voltage is supplied to each SMA and as a pulse signal equivalent to the reference bias voltage Bs (FIG. 7(b)), the signal waveforms Na1 and Nb1 shown in FIGS. 18(a) and 18(b) are set. These signal waveforms Na1 and Nb1 are formed as a pulse signal having a duty ratio set at 50% and they are complementary signals that when one of them is on, the other is off. Concretely, as shown in FIGS. 18(a) and 18(b), the on time of each of the signal waveforms Na1 and Nb1 is set to a half time of 0.5 tm of one pulse cycle tm of each of the signal waveforms Na1 and Nb1. Further, the carrier frequency of the pulse signal is set to a frequency (for example, 1 kHz or higher) sufficiently fast to the response of the SMA, thereby is suppressed to a level of ignoring the influence of a driving error due to following the pulse signal itself.

To drive the image pickup unit 9 in the direction of the + side (FIG. 4) of displacement, the signal waveforms Na2 and Nb2 shown in FIGS. 19(a) and 19(b) are generated by the digital control unit 40b. Namely, the signal waveform Na2 to the SMAa and the signal waveforms Nb2 to the SMAb are set to a duty ratio of 80% obtained by increasing 30% to the signal waveform Na1 having a duty ratio of 50% shown in FIG. 18(b) and a duty ratio of 20% obtained by decreasing 30% and keep a complementary relationship.

Impression of a voltage based on the signal waveforms Na2 and Nb2 is executed repeatedly to the SMAa and SMAb, thus the contraction operation of the SMAa is performed continuously, and the SMAb is expanded, and for example, like the target position signal Ps1 shown in FIG. 7(a), the image pickup unit 9 is moved.

Further, to drive the image pickup unit 9 in the direction of the − side (FIG. 4) of displacement, it is desirable, for example, to define the signal waveform Nb2 shown in FIG.

19(b) as a driving waveform of the SMAa and the signal waveform Na2 shown in FIG. 19(a) as a driving waveform of the SMAb.

As mentioned above, when the PWM control is executed, similarly to the analog drive control aforementioned, the response of displacement of the SMA can be improved.

<Modification>

In the constitution of the driving unit of the embodiment aforementioned, it is not essential to arrange two SMAs in the push-pull state to the moving part and it is possible to arrange one elastic member such a coil spring expandable and contractable for applying pressing force, for example, in the contraction direction and one SMA in the push-pull state.

With respect to the SMA actuator in the embodiment aforementioned, it is not essential to form it as a linear wire having an almost circular section and it is possible to form it as a belt-shaped wire having an almost rectangular section. Even in such a belt-shaped wire, when the sectional area is controlled from 80 $\mu m^2$ to 5030 $\mu m^2$, the mountability and response can be improved appropriately.

According to the embodiment of the present invention, the actuator connected to the moving part has a first member and a second member expandable and contractable, which are mutually connected to the moving part, in the push-pull arrangement and the first member is formed as a wire of shape memory alloy having a diameter of 10 μm to 80 μm (a sectional area of 80 $\mu m^2$ to 5030 $\mu m^2$). As a result, the response and mountability can be improved appropriately.

According to the embodiment of the present invention in which a wire of shape memory alloy has a diameter of 15 μm to 40 μm, the response thereof can be improved more and appropriate driving force can be ensured.

According to the embodiment of the present invention in which a wire of shape memory alloy has a sectional area of 180 $\mu m^2$ to 1260 $\mu m^2$, the response thereof can be improved more and appropriate driving force can be ensured.

According to the embodiment of the present invention in which driving of the moving part by the actuator is rotation around a predetermined axis, the response can be improved more.

According to the embodiment of the present invention in which a wire of shape memory alloy contains titanium, nickel, and copper, the transformation ending temperature is raised, thus a heat dissipation response can be ensured.

According to the embodiment of the present invention in which the moving part is driven by the actuator, thus image shaking relating to the image pickup means is corrected, an appropriate image stabilization can be performed using the SMA actuator.

What is claimed is:

1. A driving device for driving a moving part, comprising:
   a body member;
   a first member which is made of a shape memory alloy wire having a diameter of no less than 10 μm and no more than 80 μm, is expandable and contractable, and is extended between the body member and the moving part;
   a second member which is expandable and contractable and is arranged between the body member and the moving part such that the second member biases the first member so as to generate a tensile force in the first member and expand the first member;
   a measurement section which obtains a measurement value related to driving of the moving part having been driven by the first member and the second member; and
   a control section which controls the driving of the moving part by supplying a voltage to the first member on the basis of a deviation of the measurement value from a driving target value related to the driving of the moving part;
   wherein, when a voltage is supplied to the first member, the first member contracts itself and moves the moving part in a first direction, and when the voltage supplied to the first member is reduced, the first member is expanded by the tensile force applied by second member so as to move the moving part in a second direction different from the first direction.

2. The driving device of claim 1, wherein the second member is a shape memory alloy wire having a diameter of no less than 10 μm and no more than 80 μm, and
   wherein, when a voltage is supplied to the second member, the second member contracts and increases the tensile force applied to the first member so as to expand the first member and move the moving part in the second direction.

3. The driving device of claim 1, wherein the shape memory alloy wire has a diameter of no less than 15 μm and no more than 40 μm.

4. The driving device of claim 1, wherein, when driving the moving part, the moving part is rotated about a predetermined axis by the first member and the second member.

5. The driving device of claim 1, wherein, when driving the moving part, the moving part is rotated about a predetermined fulcrum by the first member and the second member.

6. The driving device of claim 1, wherein the shape memory alloy wire includes titanium, nickel and copper.

7. The driving device of claim 1, wherein the voltage applied to the shape memory alloy wire includes a bias voltage and a driving signal superimposed on the bias voltage.

8. A driving device for driving a moving part, comprising:
   a body member;
   a first member which is made of a shape memory alloy wire having a cross-sectional area of no less than 80 $\mu m^2$ and no more than 5030 $\mu m^2$, is expandable and contractable, and is extended between the body member and the moving part;
   a second member which is expandable and contractable and is arranged between the body member and the moving part such that the second member biases the first member so as to generate a tensile force in the first member and expand the first member;
   a measurement section which obtains a measurement value related to driving of the moving part having been driven by the first member and the second member; and
   a control section which controls the driving of the moving part by supplying a voltage to the first member on the basis of a deviation of the measurement value from a driving target value related to the driving of the moving part;
   wherein, when a voltage is supplied to the first member, the first member contracts itself and moves the moving part in a first direction, and when the voltage supplied to the first member is reduced, the first member is expanded by the tensile force applied by the second member so as to move the moving part in a second direction different from the first direction.

9. The driving device of claim 8, wherein the second member is a shape memory alloy wire having a cross-sectional area of no less than 80 $\mu m^2$ and no more than 5030 $\mu m^2$, and
   wherein, when a voltage is supplied to the second member, the second member contracts and increases the tensile force applied to the first member so as to expand the first member and move the moving part in the second direction.

10. The driving device of claim 8, wherein the shape memory alloy wire has a cross-sectional area of no less than 180 μm² and no more than 1260 μm².

11. The driving device of claim 8, wherein, when driving the moving part, the moving part is rotated about a predetermined axis by the first member and the second member.

12. The driving device of claim 8, wherein, when driving the moving part, the moving part is rotated about a predetermined fulcrum by the first member and the second member.

13. The driving device of claim 8, wherein the shape memory alloy wire includes titanium, nickel and copper.

14. The driving device of claim 8, wherein the voltage applied to the shape memory alloy wire includes a bias voltage and a driving signal superimposed on the bias voltage.

15. An image stabilizing system comprising:
  a driving device for driving a moving part comprising:
    a body member;
    a first member which is made of a shape memory alloy wire having a diameter of no less than 10 μm and no more than 80 μm, is expandable and contractable, and is extended between the body member and the moving part;
    a second member which is expandable and contractable and is arranged between the body member and the moving part such that the second member biases the first member so as to generate a tensile force in the first member and expand the first member;
    a measurement section which obtains a measurement value related to the driving of the moving part having been driven by the first member and the second member; and
    a control section which controls the driving of the moving part by supplying a voltage to the first member on the basis of a deviation of the measurement value from a driving target value related to the driving of the moving part,
    wherein, when a voltage is supplied to the first member, the first member contracts itself and moves the moving part in a first direction, and when the voltage supplied to the first member is reduced, the first member is expanded by the tensile force applied by the second member so as to move the moving part in a second direction different from the first direction;
  an imaging section which includes the moving part and images a photographic subject; and
  a correction section which corrects image shaking related to the imaging section by driving the moving part by controlling the driving device.

16. An image stabilizing system comprising:
  a driving device for driving a moving part comprising:
    a body member;
    a first member which is made of a shape memory alloy wire having a cross-sectional area of no less than 80 μm² and no more than 5030 μm², is expandable and contractable, and is extended between the body member and the moving part;
    a second member which is expandable and contractable and is arranged between the body member and the moving part such that the second member biases the first member so as to generate a tensile force in the first member and expand the first member;
    a measurement section which obtains a measurement value related to the driving of the moving part having been driven by the first member and the second member; and
    a control section which controls the driving of the moving part by supplying a voltage to the first member on the basis of a deviation of the measurement value from a driving target value related to the driving of the moving part,
    wherein, when a voltage is supplied to the first member, the first member contracts itself and moves the moving part in a first direction, and when the voltage supplied to the first member is reduced, the first member is expanded by the tensile force applied by the second member so as to move the moving part in a second direction different from the first direction;
  an imaging section which includes the moving part and images a photographic subject; and
  a correction section which corrects image shaking related to the imaging section by driving the moving part by controlling the driving device.

* * * * *